United States Patent
Chen et al.

(10) Patent No.: US 11,152,861 B2
(45) Date of Patent: Oct. 19, 2021

(54) MULTIPHASE CONVERTER DESIGN WITH MULTI-PATH PHASE MANAGEMENT

(71) Applicant: TEXAS INSTRUMENTS INCORPORATED, Dallas, TX (US)

(72) Inventors: Wenliang Chen, Plano, TX (US); Reza Sharifi, Sunnyvale, CA (US); Byron Mitchell Reed, Murphy, TX (US); Jairo Daniel Olivares, Richardson, TX (US); Ryan Erik Lind, Knoxville, TN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/880,452

(22) Filed: May 21, 2020

(65) Prior Publication Data
US 2020/0373842 A1 Nov. 26, 2020

Related U.S. Application Data

(60) Provisional application No. 62/850,754, filed on May 21, 2019.

(51) Int. Cl.
| | |
|---|---|
| *H02M 3/158* | (2006.01) |
| *H02M 1/00* | (2006.01) |
| *H02M 3/156* | (2006.01) |
| *H02M 7/483* | (2007.01) |

(52) U.S. Cl.
CPC ....... *H02M 3/1584* (2013.01); *H02M 3/1563* (2013.01); *H02M 7/483* (2013.01); *H02M 1/0009* (2021.05); *H02M 1/0067* (2021.05); *H02M 1/0077* (2021.05); *H02M 3/1586* (2021.05)

(58) Field of Classification Search
CPC . H02M 1/0067; H02M 1/0077; H02M 3/1584
USPC .......................... 323/271, 272, 282, 284, 285
See application file for complete search history.

(56) References Cited

U.S. PATENT DOCUMENTS

| | | | |
|---|---|---|---|
| 7,107,468 B2 * | 9/2006 | Pullen ................. | H02M 3/1584 323/259 |
| 9,106,201 B1 * | 8/2015 | Chakraborty ........... | G05F 1/461 |
| 2008/0238390 A1 * | 10/2008 | Trivedi ............... | H02M 3/1584 323/283 |

(Continued)

*Primary Examiner* — Gary A Nash
(74) *Attorney, Agent, or Firm* — Michael A. Davis, Jr.; Charles A. Brill; Frank D. Cimino

(57) ABSTRACT

This disclosure relates to a multiphase converter design with multi-path phase management circuit and output logic. The phase management circuit and output logic can be employed to implement phase adding and shedding operations based on input and output current information and based on control signals for a power stage of the converter. In some examples, the design employs an estimate of an average output current based on a current at an input of the converter for phase control. In additional examples, the design employs cycle-by-cycle current limit and maximum duty-cycle signals to enable phase quickly during load transient. In further examples, the design employs low input and output-current sensed signals for efficient phase shedding and power saving. The design herein improves an overall accuracy of phase adding and shedding, load transient response performance, an operational efficiency and thermal performance of multiphase converter.

28 Claims, 6 Drawing Sheets

(56) References Cited

U.S. PATENT DOCUMENTS

2009/0001945 A1\* 1/2009 Wickersham ....... H02M 3/1584
323/263
2016/0233766 A1\* 8/2016 Todorov .............. H02M 3/1584

\* cited by examiner

MULTIPHASE CONVERTER DESIGN WITH MULTI-PATH PHASE MANAGEMENT

RELATED APPLICATIONS

This application claims priority from U.S. Provisional Patent Application Ser. No. 62/850,754, filed 21 May 2019, which is incorporated herein by reference in its entirety.

TECHNICAL FIELD

This relates to multiphase converters. More particularly, this relates to phase management in a multiphase converter.

BACKGROUND

Multiphase converters can be used in electronic device applications (e.g., portable devices, such as cellphones, tablets, laptops, etc.). In a multiphase converter, such as a multiphase buck converter, sets of switching devices and corresponding inductors are coupled in parallel to one another, and the set of switches are operated in alternating phases. The multiple phase outputs are combined to provide an overall output current. There can be two, three, four or more phases based on the electronic device application. Power demand of electronic device circuitry (e.g., fast-battery charging circuitry, central processor units, field programmable gate arrays, application-specific integrated circuits, etc.) can vary widely during use, and to meet these swings in power requirements, the phases of the multiphase converter may be enabled and disabled to regulate an amount of current (or voltage) that is being provided.

DETAILED DESCRIPTION

Figure 1:
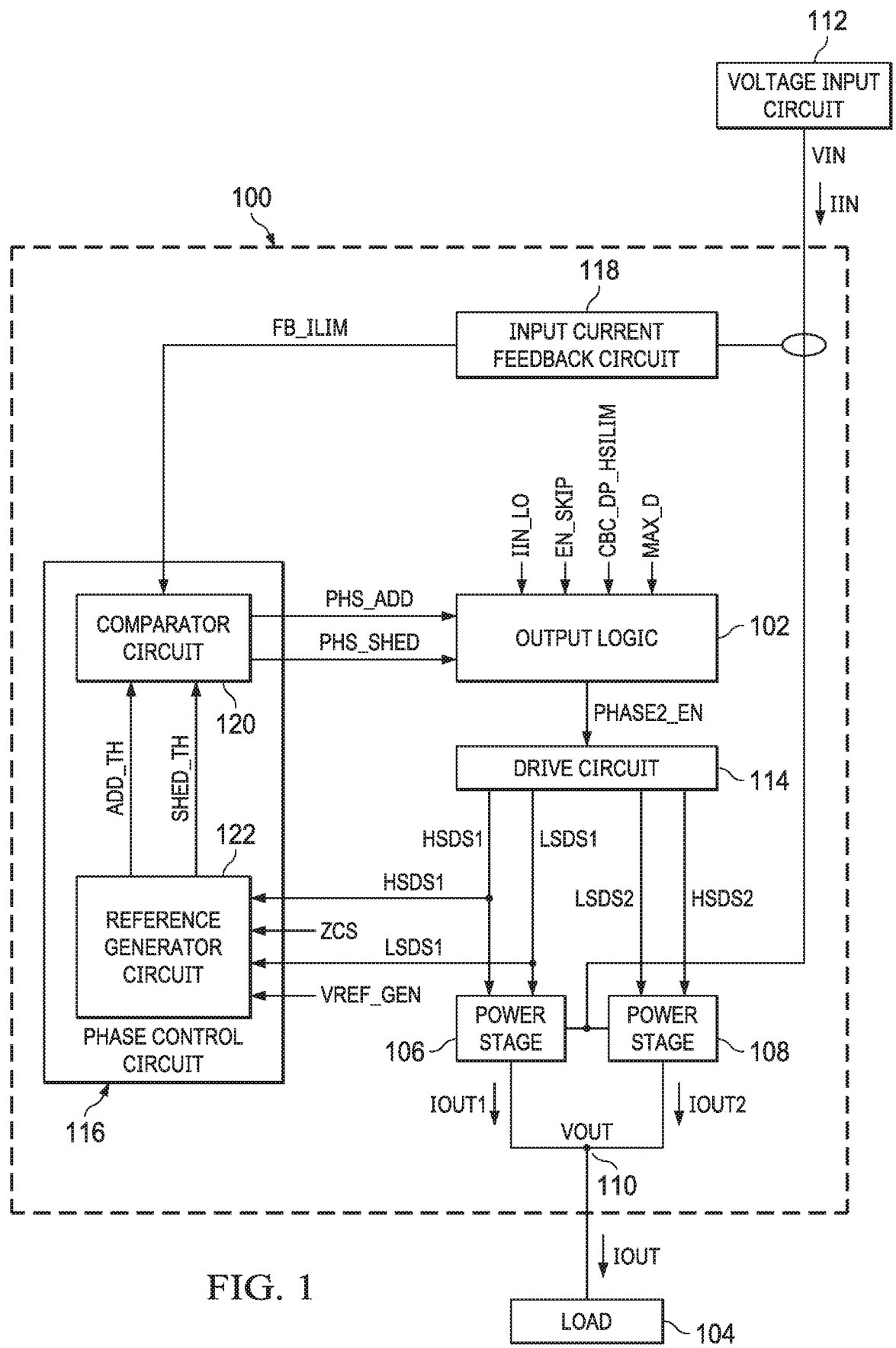
FIG. 1 is a block diagram for an example of a multiphase converter.

This description relates to phase management for multi-phase converters, such as using multiple paths for implementing phase management. In an example, a multiphase converter includes a phase control circuit and output logic. The phase control circuit is configured to provide a phase addition signal based on an input current feedback signal indicative of an input current to the multiphase converter and based on a set of drive signals for driving a first phase of the multiphase converter. The phase addition signal can be indicative of enabling a second phase of the multiphase converter, such that the multiphase converter provides an output current that is based on a current from the first and second phases of the multiphase converter. The output logic may enable the second phase in response to detecting the phase addition signal. In additional or alternative examples, the output logic enables adding of the second phase in response to detecting a high average output current condition and/or a maximum duty cycle for the first phase. In further examples, the phase control circuit is configured to provide a phase shedding signal to exit a multiphase operation. The output logic may disable the second phase in response to detecting the phase shedding signal in response to a decrease of the output current (e.g., average output current). In additional or alternative examples, the output logic disables the second phase in response to detecting a low average input current condition and/or entry into a burst or skip mode. Respective thresholds may be set to detect current conditions that trigger changes in the multiphase operation based on the input current.

As a further example, the output logic includes an output, which is adapted to be coupled to a drive circuit for controlling each phase of the multiphase converter. The output logic provides an output control signal including a state, which is based on the phase control signal, to enable or disable the second phase of the multiphase converter. Accordingly, the phase management technique described herein provides an efficient and stable control scheme for managing phase addition and phase shedding over a wide range of output currents. Moreover, the phase management technique can also improve load transient performance of the multiphase converter in the absence of complicated high-voltage circuit designs.

As used herein, the term "circuit" can include a collection of active and/or passive elements that perform an electronic circuit function, such as an analog circuit and/or digital circuit. Additionally or alternatively, for example, the term "circuit" can include an integrated circuit (IC) where all or some of the circuit elements are fabricated on a common substrate (e.g., semiconductor substrate, such as a die or chip) or within a common package herein. For example, circuitry of a converter (e.g., a ramp generator, comparators, drive circuit, and the like) can be implemented on a semiconductor substrate. Additionally, the term "couple" is used throughout the specification. The term may cover connections, communications, or signal paths that enable a functional relationship consistent with the description of the present disclosure. For example, if device A generates a signal to control device B to perform an action, in a first example device A is configured to device B, or in a second example device A is configured to device B through intervening component C if intervening component C does not substantially alter the functional relationship between device A and device B such that device B is controlled by device A via the control signal generated by device A.

FIG. 1 is a block diagram for an example of a multiphase converter 100. In some examples, the multiphase converter 100 is a multiphase buck converter and is configured to provide a direct-current (DC) voltage. In this regard, the multiphase converter can be referred to as a DC-to-DC voltage converter. The multiphase converter 100 may be implemented in an electronic system, such as a battery-operated electronic device (e.g., a cellular device, a personal digital assistance (PDA), a tablet, a laptop, etc.). For example, the multiphase converter 100 can be employed in charger systems, such as a fast charger system or an induction-powered charger system.

The multiphase converter 100 includes output logic 102, which may be implemented in software, circuitry or as a combination of instructions and circuits. In an example, the output logic 102 implements phase addition and phase shedding to regulate an amount of an output current, which is labeled as "IOUT" in FIG. 1 provided by the multiphase converter 100 to the load 104. As an example, the load 104 is a battery. As used herein, the term "phase" can refer to a power stage. Thus, the terms "phase" and "power stage" can be used interchangeably. Thus, the phrase "phase addition" can refer to enabling a power stage to provide a stage output current. The phrase "phase shedding" can refer to disabling a power stage to provide no stage output current. The term "enabling" means that high-side and low-side drive signals have a first state, and the term "disabling" means that the high-side and low-side drive signals have a second state, which is different from the first state.

In some examples, the multiphase converter 100 includes two more power stages, which are demonstrated in FIG. 1 as a first power stage 106 and a second power stage 108. In other examples, the multiphase converter 100 includes four phases, eighth phases or twelve phases. The output logic 102 can be configured to control phase addition and shedding of the second power stage 108 of the multiphase converter 100. Each of the power stages 106 and 108 can include one or more transistors and an inductor. The transistors can include metal-oxide semiconductor field-effect transistors (MOS-FETs), junction field-effect transistors (JFETs), bipolar junction transistors (BJTs), insulated gate bipolar transistors (IGBTS), high electron mobility transistors (HEMTs), or other types of power transistors depending on the use environment. In an example, each of the first and second power stages 106 and 108 can include high-side and low-side FETs arranged as a half-bridge, in which a node between the respective FETs is coupled to an output node 110 of the multiphase converter 100.

As a further example, the high-side and low-side FETs of each of the first and second power stages 106 and 108 can be switched (e.g., turned-on and turned-off) to charge and discharge the inductor based on an input voltage VIN to provide an output voltage VOUT at the output node 110. A voltage input circuit 112 can be configured to supply an input voltage VIN (e.g., a DC input voltage) to an input node of the multiphase converter 100. The voltage input circuit 112 can be configured to receive a source voltage from a source. In an example, the source corresponds to a universal serial bus (USB) voltage source, such as a USB port of an electronic device (e.g., a USB charger). In another example, the source is a wireless charging device (e.g., a wireless charging pad). The voltage input circuit 112 can be configured to provide the input voltage based on the source voltage.

As illustrated in the example of FIG. 1, outputs of the first and second power stages 106 and 108 are coupled to the output node 110. Thus, the multiphase converter 100 is configured to control the first power stage 106 to provide a portion of the output current, and, during multiphase operation, the second power stage 108 is controlled to provide another portion of the output current. Because the respective power stages 106 and 108 are coupled in parallel to the output, a greater output current may be provided to the load 104 than can be provided individually by the first power stage 106. The first power stage 106 is configured to provide a first stage output current, which is labeled as "IOUT1" in FIG. 1, to the output node 110, and the second power stage 108 is configured to provide a second stage output current, which is (labeled as "IOUT2" in FIG. 1, to the output node 110. The amount of the output current provided to the load 104 is based on the first and second stage output currents.

The multiphase converter 100 includes a drive circuit 114 configured to control the first and second power stages 106 and 108 to provide first and second stage output currents, respectively. The drive circuit 114 can include outputs coupled to respective inputs of the first power stage 106 as well as to respective inputs of the second power stage 108. In some examples, the drive circuit 114 is coupled to inputs of a switch circuit to output a first set of drive signals, which include a first high-side drive signal HSDS1 and a first low-side drive signal LSDS1. An input of the first power stage 106 is coupled to the drive circuit 114 to receive the first high-side drive signal and another input of the first power stage 106 is coupled the drive circuit to receive the first low-side drive signal. Similarly, inputs of the second power stage 108 receive respective second high-side drive and low-side drive signals HSDS2 and LSDS2. The first high-side and low-side drive signals can be provided to the first power stage 106 to switch (e.g., turn-on and off) respective high-side and low-side FETs of the first power stage 106 to provide the output voltage at the output node 110. While the first power stage is enabled, the second power stage 108 can be disabled, such that the first stage output current is provided as the total output current to the load 104.

In some examples, output current requirement for the load 104 may increase beyond that can be provided by the first power stage 106 or exceeds a current output limit of the first power stage 106. In these examples, a phase control circuit 116 controls the output logic 102 to implement phase addition to enable the second power stage 108 to provide additional output current to the load 104. In this way, the second power stage 108 can provide the second stage output current, which is combined with the first stage output current to provide the total output current to the load 104. In some examples, the first and second power stages 106 and 108 share equally the amount of the output current that is being provided. In other examples, the first power stage 106 provides a first amount of the output current and the second power stage 108 provides a second amount of the output current, which is different from the first amount.

As a further example, the output logic 102 includes an output coupled to an input of the drive circuit to provide a second stage enable signal, which is labeled as "PHASE2_EN" in FIG. 1, to enable the second power stage 108 to provide the second stage output current IOUT2. In some examples, the output logic 102 is configured to add (e.g., enable) the second power stage 108 to provide the portion of the output current based on an input current IIN and a phase addition signal PHS_ADD. The input of the drive circuit 114 can be coupled to an output of the output logic 102 to receive the second stage enable signal. The second stage enable signal can cause the drive circuit 114 to generate a second set of drive signals that include the second high-side drive signal and the second low-side drive signal. For example, inputs of the second power stage 108 are coupled to the drive circuit 114 receive the second high side and low-side drive signals. The second high-side and low-side drive signals can be provided to the second power stage 108 with alternating logic high and low signal states to switch (e.g., turn-on and off) the high-side and low-side FETs of the second power stage 108 to provide the second stage output current IOUT2 to the output node 110, which results in the output voltage.

The multiphase converter 100 can include an input current feedback circuit 118 configured to sense the input current and provide an input current feedback signal FB_ILIM, which is indicative of the input current to the multiphase converter 100. For example, an input of the input current feedback circuit 118 can be coupled to measure the input current IIN, and an output of the input current feedback circuit 118 can be coupled to provide the input current feedback signal to an input of a phase control circuit 116. The phase control circuit 116 can include a comparator circuit 120 and a reference generator circuit 122. The comparator circuit 120 includes an input coupled to the output of the input current feedback circuit 118 to receive the input current feedback signal. The comparator circuit 120 also includes inputs coupled to receive a phase addition threshold ADD_TH, and a phase shedding threshold SHED_TH from the reference generator circuit 122. The comparator circuit 120 includes an output, which is coupled to an input of the output logic 102, to provide the phase addition signal in response to determining that the input current feedback signal is greater than or equal to the phase addition threshold. The output logic 102 thus can be configured to implement phase addition to enable the second power stage 108 to provide the second stage current based on the phase addition signal. There can be a hysteresis between the phase addition and phase shedding thresholds to prevent mode hopping or oscillation. Thus, the phase addition threshold can be a number of milli-amps (mA) above the phase shedding threshold. For example, the phase addition threshold can be set several hundreds of mA above the threshold.

In some examples, the phase control circuit 116 also includes an output, which is coupled to an input of the output logic 102, to provide a phase shedding signal PHS_SHED, which indicates the output current is less than or equal to the phase shedding threshold. For example, the comparator circuit 120 is configured to compare the input current feedback signal to the phase shedding threshold and cause the phase control circuit 116 to provide the phase shedding signal in response to determining that the input current feedback signal is less than or equal to the phase shedding threshold. The output logic 102 can be configured to implement phase shedding in response to the phase shedding signal to reduce the amount of the output current being provided to the load 104, such as by disabling a previously enabled second power stage. In some examples, the phase adding threshold is greater than the phase shedding threshold to prevent mode hopping or oscillation caused by noises.

In some examples, the reference generator circuit 122 is configured to generate the phase addition and shedding thresholds based on the first high-side drive signal, the first low-side drive signal and, in some examples, based on a zero-crossing signal ZCS. The reference generator circuit 122 can include a first input, which is coupled to the first output of the drive circuit 114, to receive the first high-side drive signal, a second input, which is coupled to the second output of the drive circuit 114, to receive the first low-side drive signal and a third input, which is coupled to an output of a zero-crossing detection circuit of the multiphase converter 100, to receive the zero-cross signal. The zero-crossing detection circuit is configured to generate the zero-crossing signal with a logic state (e.g., a logic low value) to indicate that the first stage output current is positive (e.g., greater than 0A).

In some examples, the reference generator circuit 122 includes a fourth input coupled to an output of a voltage reference circuit to receive a reference generator voltage VREF_GEN. In some examples, the voltage reference circuit is configured to provide the reference generator voltage based on a bandgap voltage, such as in applications wherein the multiphase converter 100 is implemented on an IC. The reference generator circuit 122 can be configured to generate the phase addition and shedding thresholds based on the reference generator voltage. For example, the reference generator circuit 122 includes circuitry configured to modulate (e.g., chop) the reference generator voltage based on the first high-side drive signal and the first low-side drive signal. In some examples, the reference generator circuit 122 is configured to modulate the reference generator voltage based on the zero-crossing signal to provide a modulated reference voltage. The reference generator circuit 122 can be configured to multiply the modulated reference voltage by respective first and second multiplication factors to provide the phase addition and shedding thresholds.

In some examples, the output logic 102 is configured to provide the second stage enable signal in response to determining that the phase addition signal has an amplitude that exceeds a predetermined phase addition threshold for a defined period of time. The predetermined phase addition threshold and the defined period of time can be user-defined. In some examples, the defined period of time corresponds to a number of clock cycles of the clock signal (e.g., a count value). Accordingly, the multiphase converter 100 can implement phase addition based on the input current and the phase addition threshold. Because the phase addition threshold is based on the first high-side and low-side drive signals and, in some examples, based on the zero-crossing signal, the phase addition threshold can be indicative of the output current.

In some examples, the output logic 102 is configured to output the second phase enable signal in response to receiving a cycle-by-cycle current limit signal CBC_DP_HSILIM to enable the second power stage 108 to provide the second stage output current. The cycle-by-cycle current limit signal can be generated by a cycle-by-cycle current detection circuit in response to determining that the first stage output current is equal to or greater than a cycle-by-cycle current threshold. In some examples, to protect the inductor of the first power stage 106 from saturation by excessive current, the cycle-by-cycle current threshold is set to be less than a saturation current of the inductor.

In some examples, the output logic 102 is configured to output the second phase enable signal in response to receiving at an input a maximum duty cycle signal MAX_D. Thus, in these examples, the multiphase converter 100 is configured to employ duty cycle information to control phase addition (e.g., enabling of the second power stage 108) to increase the output current being provided to the load 104. Various approaches can be employed to determine the phase duty cycle of the first phase. For example, drive logic can be configured to determine the phase duty cycle based on the on-time of the first high-side drive signal relative to an off-time of the first high-side drive signal over a respective clock cycle of the clock signal. During operation, the first power stage 106 can reach a maximum duty cycle and, in response, the drive logic causes the maximum duty cycle signal to be outputted to indicate that the duty cycle of first power stage 106 is equal to or greater than the duty cycle phase threshold. The output logic 102 can be configured to output the second phase enable signal in response to the maximum duty cycle signal to enable the second power stage 108 to provide the second stage output current to the load 104. In some examples, the output logic 102 can be configured to output the second phase enable signal in response to determining that the maximum duty cycle exceeds a predetermined duty cycle threshold for a number of clock cycles of a clock signal. The predetermined duty cycle threshold and the number of clock cycles of the clock signal can be user-defined.

Accordingly, the output logic 102 can be configured to implement phase addition to enable two or more phases of the multiphase converter 100 to contribute to the total amount of the output current being provided to the load 104 based on the phase addition signal, the cycle-by-cycle current limit signal or the maximum duty cycle signal. In examples wherein the load 104 is the battery, the multiphase converter 100 can enter multiphase operation to rapidly charge the battery.

In some examples, the output logic 102 is configured to cause the multiphase converter 100 to shed the added phase, such as when the load 104 draws a decreased output current. For example, following rapid charging of the battery, for a period of time, the multiphase converter 100 can be configured to disable the added phase (e.g., the second power stage 108) and thus conserve power. To shed the added phase, the phase control circuit 116 is configured to provide the phase shedding signal to the output logic 102 based on the output current being less than or equal to the phase shedding threshold. In response, the output logic 102 implements phase shedding. For example, the output logic 102 may stop outputting the second phase enable signal (e.g., change the state from logic high to logic low) to the drive circuit 114 to shed (e.g., disable) the second power stage 108, and thus reduce the amount of the output current being provided to the load 104. In some examples, the output logic 102 is configured to disable the second power stage 108 in response to receiving the phase shedding signal for a period of time (e.g., a number of consecutive clock cycles) while also not receiving either the phase addition signal or the cycle-by-cycle current limit signal during the period of time.

In some examples, the output logic 102 is configured to implement phase shedding to disable the second phase in response to receiving at an input a low input sensed current signal IIN_LO. For example, an input current sensor circuit can be configured to output the low input sensed current signal in response to determining that the input current is less than or equal to an input current threshold. The input current threshold can be user-defined. In some examples, the input current threshold has an amplitude that is in a milliamps (mA) range.

In some examples, the multiphase converter 100 is configured to enter a burst or a skip mode of operation, such as in response to a low output current condition (e.g., less than a few mA). In response to entering one of the burst or the skip mode of operation, the output logic 102 can be configured to receive at an input a mode enabled signal EN_SKIP. The output logic 102 can be configured to shed one or more phases and thus reduce the output current being provided in response to the mode enabled signal, which indicates entry into one of the skip or burst mode of operation. In response to the mode enabled signal, the output logic 102 may stop outputting the second phase enable signal (e.g., change the state from logic high to logic low) to the drive circuit 114 to disable the second power stage 108. In some examples, the output logic 102 is configured to disable the second power stage 108 in response to receiving the mode enabled signal over a first set of clock cycles of the clock signal, receiving the phase shedding signal over a second set of clock cycles of the clock signal, and not receiving the phase addition signal over the second set of clock cycles.

Accordingly, the output logic 102 can be configured to implement phase shedding to decrease the amount of the output current being provided to the load 104, such as in response to a decrease in load current requirements, which are based on the phase shedding signal, the low input current sensed signal or the mode enabled signal EN_SKIP. Thus, the output logic 102 can be configured to cause the multiphase converter 100 to shed phases (e.g., the second power stage 108) as the load requirements for the load 104 is reduced. In examples in which the load 104 is the battery, the multiphase converter 100 can shed previously added phases as the battery is at or about a full battery charge.

Thus, by implementing the phase management technique described herein provides an efficient control scheme for phase addition and shedding over a wide range of output currents. Additionally, the multiphase converter 100 has improved load transient performance in contrasting to other multiphase converters that do not employ the output logic 102 and the phase control circuit 116, as described herein. Moreover, by implementing the phase management technique described herein in a charger system employing a multiphase converter can reduce a temperature of the charger system, thereby improving thermal performance of the charger system, which can extend the operating life of the charger system. This is because the phase management technique described herein balances an output power and power losses evenly between phases of the multiphase converter 100, which spreads heat dissipation evenly and thus reduces a temperature of system components of the charger system.

Figure 2:
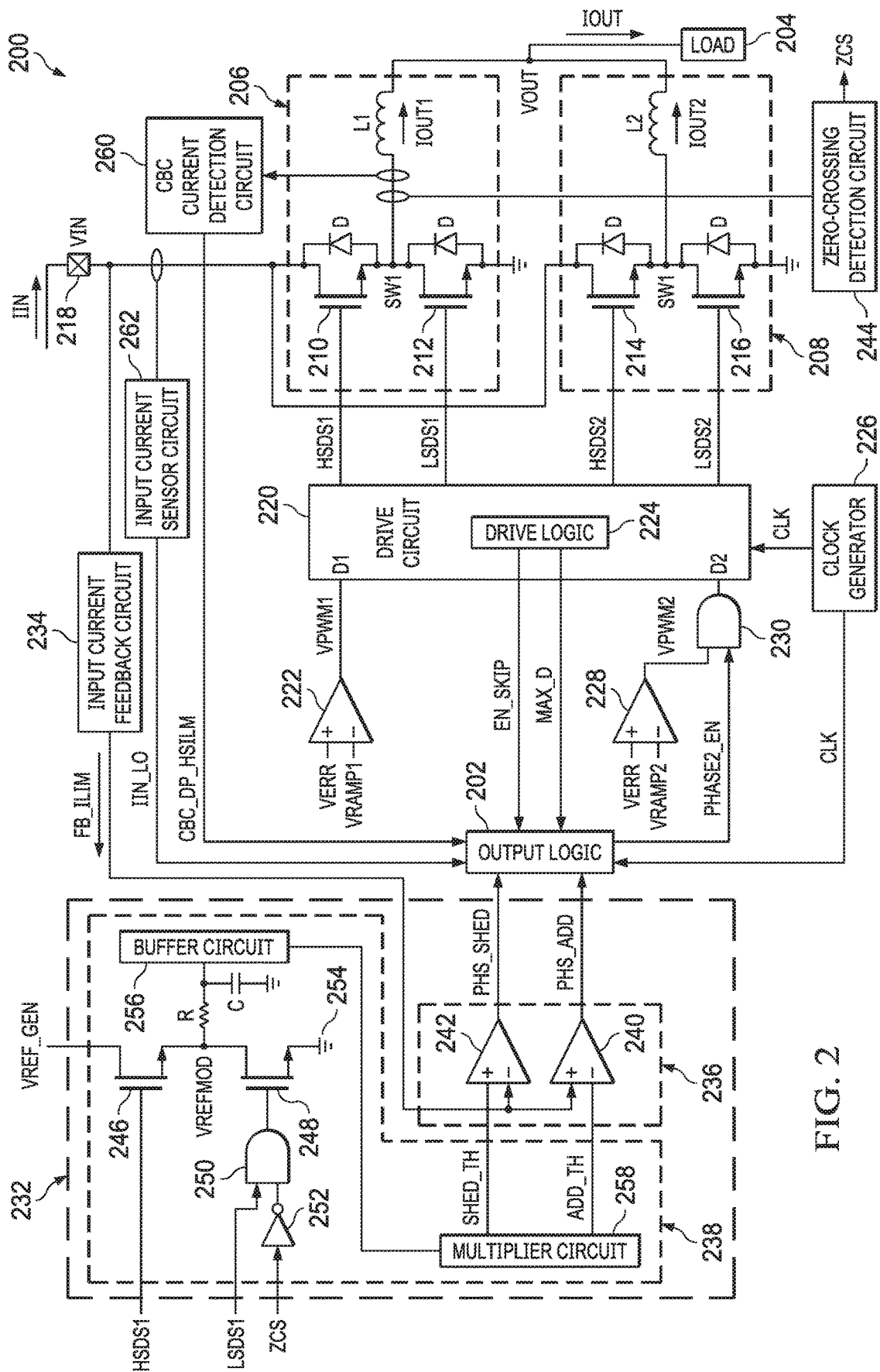
FIG. 2 is a circuit diagram illustrating an example of a multiphase converter.

FIG. 2 illustrates another example of a multiphase converter 200. In some examples, the multiphase converter 200 can correspond to the multiphase converter 100, as illustrated in FIG. 1. The multiphase converter 200 can be employed in any electronic device that can require output current IOUT greater than can be provided by a single-phase converter (e.g., a single-phase buck converter). For example, the multiphase converter 200 can be implemented in battery-operated electronic devices to provide for fast charging of one or more cells of batteries of the device.

The multiphase converter 200 can include output logic 202. In some examples, the output logic 202 corresponds to the output logic 102, as illustrated in FIG. 1. The output logic 202 can be configured to implement phase addition and shedding to regulate the output current IOUT provided to a load 204 coupled to an output node of the converter 200. In some examples, the load 204 corresponds to the load 104, as illustrated in FIG. 1. The multiphase converter 200 includes a first power stage 206 and a second power stage 208, which can correspond to the first and second power stages 106 and 108 as illustrated in FIG. 1. Outputs of the first and second power stages 206 and 208 can be coupled to provide current IOUT1 and IOUT2 to the load 204.

The first power stage 206 can include a first high-side FET 210, a first low-side FET 212 and a first inductor L1. The second power stage 208 can include a second high-side FET 214, a low-side FET 216 and a second inductor L2. The FETs 210 and 212 of the first power stage 206 and the FETs 214 and 216 of the second power stage 208 can be switched (e.g., turned-on and turned-off) to charge and discharge current through a respective inductor L1 or L2 to provide an output voltage VOUT to the load 204. The input node 218 can be coupled to respective inputs of the first and second power stages 206 and 208 to receive the input voltage VIN, such as described with respect to FIG. 1. In some examples, the first and second power stages 206 and 208 are coupled in parallel between the input node 218 and the load 204 to provide respective output current IOUT1 and IOUT2 in FIG. 2 to the load 204 to provide an aggregate output current IOUT (e.g., IOUT=IOUT1+IOUT2).

The multiphase converter 200 includes a drive circuit 220, which may be implemented as the drive circuit 114 of FIG. 1. The drive circuit 220 includes outputs coupled to provide the first power stage 206 with a first set of drive signals HSDS1 and LSDS1, respectively. The first power stage 206 can include inputs that are coupled to receive the first high-side and low-side drive signals HSDS1 and LSDS1, respectively, which may correspond to the first set of drive signals, as illustrated in FIG. 1.

The multiphase converter 200 can include a first pulse-width modulated (PWM) comparator circuit 222. The first PWM comparator circuit 222 includes a first input coupled to receive a first ramp VRAMP1 and a second input coupled to receive an error voltage feedback signal VERR. The first ramp signal can be provided by a ramp generator circuit and the error voltage feedback signal can be provided by an error amplifier circuit of the multiphase converter 200. In some examples, the error amplifier circuit is configured to provide the error voltage feedback signal based on a reference output voltage and the output voltage. The reference output voltage can define a target DC voltage for the output voltage VOUT at the load 204. The first PWM comparator circuit 222 can be configured to generate a first PWM signal, which is labeled as VPWM1, based on the first ramp signal and the error voltage feedback signal. The drive circuit 220 can include a first drive input D1 coupled to receive the first PWM signal from an output of the first PWM comparator circuit 222.

In some examples, the drive circuit 220 includes drive logic 224. The drive logic 224 can be implemented in software (e.g., a set of instructions), by circuitry or a combination of instructions and circuitry configured to implement one or more functions, as described herein. The multiphase converter 200 can include a clock generator 226 that includes an output coupled to provide a clock signal CLK to a clock input of the drive circuit 220. The drive logic 224 can include circuitry to control generation of drive signals based on PWM signals during a clock cycle of the clock signal CLK. Thus, the drive logic 224 can be configured to provide first high-side and low-side drive signals HSDS1 and LSDS1 to the first power stage 206 which may be inverted versions of each other.

The multiphase converter 200 can further include a second PWM comparator circuit 228. The second PWM comparator circuit 228 includes a first input coupled to receive a second ramp signal VRAMP2 and a second input coupled to receive the error voltage feedback signal VERR. The second ramp signal can be provided by the ramp generator circuit. The second PWM comparator circuit 228 can include an output that is coupled to provide a second PWM signal based on the second ramp signal VRAMP2 and the error voltage feedback signal VERR. Although FIG. 2 illustrates the first and second PWM comparator circuits 222 and 228 as being implemented outside the output logic 202, in other examples, the first and second PWM comparator circuits 222 and 228 may be implemented as part of the output logic 202.

The multiphase converter 200 can also include an AND gate 230. The AND gate 230 can include a first input, a second input and an output. The first input of the AND gate 230 is coupled to receive the second PWM signal. The second input of the AND gate 230 is coupled to receive a second phase enable signal PHASE2_EN from the output logic 202. The output of the AND gate 230 is coupled to provide a second stage gate output signal, which has a duty cycle similar to a duty cycle of the PWM output from the second PWM comparator circuit 228, in response to receiving the second PWM signal and the second phase enable signal. In some examples, the output of the logical AND gate 230 is coupled to provide the second gated PWM signal to an input D2 of the drive circuit 220. Although FIG. 2 illustrates the AND gate 230 as being implemented outside the output logic 202 or the drive circuit 220, in other examples, the AND gate 230 is implemented as part of the output logic 202 or the drive circuit 220.

In some examples, the drive circuit 220 is configured to generate a second set of drive signals HSDS2 and LSDS2 based on the second gated PWM signal received at the second drive input. The drive circuit 220 can include a third output coupled to provide the second high-side drive signal and a fourth output coupled to provide the second low-side drive signal. The second power stage 208 can include a second input coupled to the third output of the drive circuit 220 to receive second high-side drive signal and a third input coupled to the fourth output of the drive circuit 220 to receive the second low-side drive signal. The second high-side and low-side drive signals, which may be inverted versions of each other, are provided to the second power stage 208 to switch (e.g., turn-on and off) the high-side and low-side FETs 214 and 216 to provide the second stage output current as part of the output current to the load 204.

In some examples, a phase control circuit 232 includes outputs coupled to provide phase addition and shedding signals PHS_ADD and PHS_SHED, respectively, to inputs of the output logic 202. The phase control circuit 232 may be implemented as the phase control circuit 116 of FIG. 1. Although FIG. 2 illustrates the phase control circuit 232 separate from the output logic 202, in some examples, the output logic 202 includes the phase control circuit 232. In other examples, the phase control circuit 232 includes the output logic 202. In some examples, the multiphase converter 200 includes an input current feedback circuit 234. An input of the input current feedback circuit 234 can be coupled to the input node 218 to sense the input current. The input current feedback circuit 234 includes an output coupled to provide an input current feedback signal FB_ILIM, which is indicative of the input current. The phase control circuit 232 can include a first input coupled to receive the input current feedback signal. The input current feedback circuit 234 can correspond to the input current feedback circuit 118, as described with respect to FIG. 1.

The phase control circuit 232 includes a comparator circuit 236 and a reference generator circuit 238. The comparator circuit 236 may be implemented as the comparator circuit 120 and the reference generator circuit 238 be implemented as the reference generator circuit 122, as described in FIG. 1. The comparator circuit 236 includes a first input coupled to receive the input current feedback signal, a second input coupled to receive a phase addition threshold ADD_TH and a third input coupled to receive a phase shedding threshold SHED_TH. In some examples, the comparator circuit 236 includes a first comparator 240 and a second comparator 242.

For example, the first comparator 240 includes a first input coupled to receive at a first input the input current feedback signal (e.g., at a non-inverting terminal of the first comparator 240) and a second input coupled to receive the phase addition threshold (e.g., at an inverting terminal of the first comparator 240). The first comparator 240 can be configured to compare the input current feedback signal to the phase addition threshold. The first comparator 240 includes an output coupled to provide the phase addition signal, which indicates whether the output current (e.g., an average output current) is greater than or equal to the phase addition threshold, to command the output logic 102 to implement phase addition. The first input of the output logic 202 can be coupled to the output of the first comparator 240 to receive the phase addition signal.

In some examples, the second comparator 242 includes a first input coupled to receive the input current feedback signal and a second input coupled to receive the phase shedding threshold. The second comparator 242 can be configured to compare the input current feedback signal to the phase shedding threshold. The second comparator 242 can include an output coupled to provide the phase shedding signal based on a comparison of the feedback signal and the phase shedding threshold. The second comparator 242 is configured to provide the phase shedding signal to the second input of the output logic 202 to command the output logic 202 to implement phase shedding when the input current feedback signal is less than or equal to the phase shedding threshold. The output logic 202 can be configured to implement phase shedding to reduce the amount of the output current being provided to the load 204, such as by disabling a previously enabled power stage (e.g., the second power stage 208).

In some examples, the phase control circuit 232 includes a second input coupled to receive the first high-side drive signal HSDS1, a third input coupled to receive the first low-side drive signal LSDS1, a fourth input coupled to receive a zero-crossing signal ZCS, and a fifth input coupled to receive reference generator voltage VREF_GEN. The reference generator voltage VREF_GEN can be provided by a voltage reference circuit. The phase control circuit 232 can further be configured to provide the phase addition and shedding signals based on the first high-side drive signal, the first low-side drive signal, the zero-crossing signal and the reference generator voltage. For example, the reference generator circuit 238 includes a first output coupled to provide the phase addition threshold to the first comparator 240 and a second output coupled to provide the phase shedding threshold to the second comparator 242. The reference generator circuit 238 can be configured to provide the phase addition and shedding thresholds based on the first high-side drive signal, the first low-side drive signal, the zero-crossing signal and the reference generator voltage.

As a further example, the multiphase converter 200 includes a zero-crossing detection circuit 244. The zero-crossing detection circuit 244 includes an input, which may be coupled to the first inductor of the first power stage 206, to monitor the first stage output current and an output coupled to provide the zero-crossing signal in response to detecting that the first stage output current is equal to 0A. The zero-crossing detection circuit 244 can be configured to provide the zero-crossing signal to the third input of the reference generator circuit 238. In some examples, the reference generator circuit 238 includes a first FET 246 and a second FET 248, which may be coupled between the reference generator voltage and an electrical ground. The first and second FETs 246 and 248 can be controlled based on the first high-side drive signal, the first low-side drive signal, and the zero-crossing signal to modulate (e.g., chop) the reference generator voltage to provide a modulated reference voltage VREFMOD. The modulated reference voltage can be multiplied by respective first and second multiplication factors to provide the phase addition and shedding thresholds, as described herein.

For example, the first FET 246 has a gate coupled to receive the first high-side drive signal. A drain of the first FET 246 is coupled to receive the reference generator voltage. The first FET 246 can be configured to modulate the reference generator voltage to provide the modulated reference voltage with an on-time similar to an on-time of the high-side drive signal. Thus, during a respective clock cycle of the clock signal, the modulated reference voltage has the same duty cycle as the first high-side drive signal HSDS1. Thus, the modulated reference voltage can have a first high voltage value (e.g., non-zero value) during a first time portion of the respective clock cycle of the clock signal.

In some examples, during the respective clock cycle of the clock signal, the first low-side drive signal can be received at the second input of the reference generator circuit 238. The first low-side drive signal can be provided to a first input of an AND gate 250 of the reference generator circuit 238. An output of the AND gate 250 can be coupled to a gate of the second FET 248 and a source of the FET is coupled to a ground 254. A drain of the second FET 248 can be coupled to a source of the first FET 246. In some examples, a second input of the AND gate 250 can be coupled to an output of a NOT gate 252 (e.g., an inverter). An input of the NOT gate 252 can be coupled to receive the zero-crossing signal. The zero-crossing detection circuit 244 is configured to generate the zero-crossing signal with a logic state (e.g., a logic low value) to indicate that the first stage output current is positive (e.g., greater than 0A).

The NOT gate 252 can invert the zero-crossing signal to provide and inverted to an input of the AND gate 250. The AND gate 250 can be configured to drive the gate of the second FET 248 based on the inverted zero-crossing signal and the first low-side drive signal. Thus, the second FET 248 is turned on by the AND gate to pull the modulated reference voltage to a second low voltage value (e.g., a value different from the first high voltage value) during a second time portion of the respective clock cycle of the clock signal. In some examples, a filter is coupled at an intermediate node between FETs 246 and 248 to filter switching noise of the modulated reference voltage to provide a filtered modulated reference voltage. The filter can include a resistor R, which is can be coupled to the intermediate node, corresponding to the modulated reference voltage. The resistor R can be coupled between the node, which provides modulated reference voltage, and an input of a buffer circuit 256. The filter can further include a capacitor C that is coupled to the input of the buffer circuit 256 and the resistor. In other examples, the resistor can be omitted or different circuitry may be used to filter the modulated reference voltage.

The buffer circuit 256 thus receives the filtered modulated reference voltage and is configured to provide the filtered modulated reference voltage to an input of a multiplier circuit 258 of the reference generator circuit 238. The multiplier circuit 258 can be configured to multiply the filtered modulated reference voltage by respective first and second multiplication factors to generate the phase addition and shedding thresholds (ADD_TH and SHED_TH). The first output of the multiplier circuit 258 can be coupled to the first input of the comparator circuit 236 to provide the phase addition threshold and the second output of the multiplier circuit 258 can be coupled to the second input of the comparator circuit 236 to provide the phase shedding threshold.

The comparator circuit 236 can be configured to output the phase addition signal to command the output logic 202 to implement phase addition in response to determining that the input current feedback signal is equal to or greater than the phase addition threshold. The phase addition signal can command the output logic 202 to enable (e.g., turn-on) the second power stage 208. In some examples, the output logic 202 is configured to output the second phase enable signal in response to determining that the phase addition signal has an amplitude that exceeds a predetermined addition threshold for a defined period of time. The predetermined addition threshold and the defined period of time can be user-defined. Thus, the output logic 202 can be configured to output the second phase enable signal in response to the phase addition signal having a logical high value that is greater than the predetermined addition threshold for the defined period of time. In some examples, the defined period of time corresponds to a number of clock cycles of the clock signal. The output logic 202 causes the second power stage 208 to be enabled and provide the portion of the output current to the load 204.

Accordingly, the multiphase converter 200 can implement phase addition based on the input current and the phase addition threshold. Because the phase addition threshold is set based on the first high-side and low-side drive signals HSDS1 and LSDS1 and the zero-crossing signal ZCS, the phase addition threshold ADD_TH can be representative of the output current. For example, the output current can be described by the following equation:

$$IOUT = \frac{\eta \times VIN \times IIN}{VOUT}, \quad (1)$$

wherein VOUT is the output voltage from the multiphase converter 200 (at the load 204), IOUT is the output current being provided by the multiphase converter 200, VIN is the input voltage to the multiphase converter 200, IIN is the input current to the multiphase converter 200, and η is a power efficiency of the multiphase converter 200.

For example, in a buck converter operating in a continuous conduction mode (CCM), a duty cycle, D, of the first high-side drive signal HSDS1 can be expressed by the following equation:

$$D = \frac{VOUT}{VIN}, \quad (2)$$

equation (1) can be expressed by the following equations:

$$IOUT = \frac{\eta}{D} \times IIN \quad (3)$$

$$IIN = \frac{TON}{T} \times IOUT. \quad (4)$$

Accordingly, the output current of the multiphase converter 200 can be estimated indirectly based on the duty cycle of HSDS1 and the power efficiency of the multiphase converter 200. The first high-side drive signal HSDS1 can have a duty cycle corresponding to a duration of on-time, TON, that the first high-side drive signal has a high state value over a clock cycle of the clock signal CLK relative to a duration of off-time, TOFF, over the clock cycle of the clock signal that the first high-side drive signal has a low state value. Thus, the first high-side rive signal HSDS1 can be representative of the duty cycle of the multiphase converter 200.

Moreover, because there are switching and conduction losses in the high-side and low-side FETs of the first power stage 106, the on-time of the first high-side drive signal can vary from an ideal on-time (e.g., a desired on-time). A time difference between the on-time of the first high-side drive signal and the ideal on-time of the first high-side drive signal can be representative of the power efficiency of the multiphase converter 200. Thus, the on-time of the first high-side drive signal over the clock cycle can be representative of the duty cycle and the power efficiency of the multiphase converter 200 in equation (3). As such, the output current IOUT can be derived based on the input current IIN and the on-time TON of the first high-side drive signal HSDS1 and the period of corresponding clock cycle of the clock signal T=TON+TOFF in equation (4). By modulating the reference generator voltage based on the first high-side drive signal to provide the modulated reference generator voltage VREFMOD, the modulated reference voltage characterizes the duty cycle and the power efficiency of the multiphase converter 200 in equation (3). Accordingly, the phase control circuit 232 can be configured to generate the phase addition and shedding thresholds ADD_TH and SHED_TH based on the duty cycle and the power efficiency of the multiphase converter 200. As described herein, the phase addition and shedding thresholds ADD_TH and SHED_TH can be compared to the input current feedback signal to control the enabling and disabling of second power stage 208 to implement phase adding and shedding, respectively, to regulate the output current IOUT being provided to the load 204.

Figure 3:
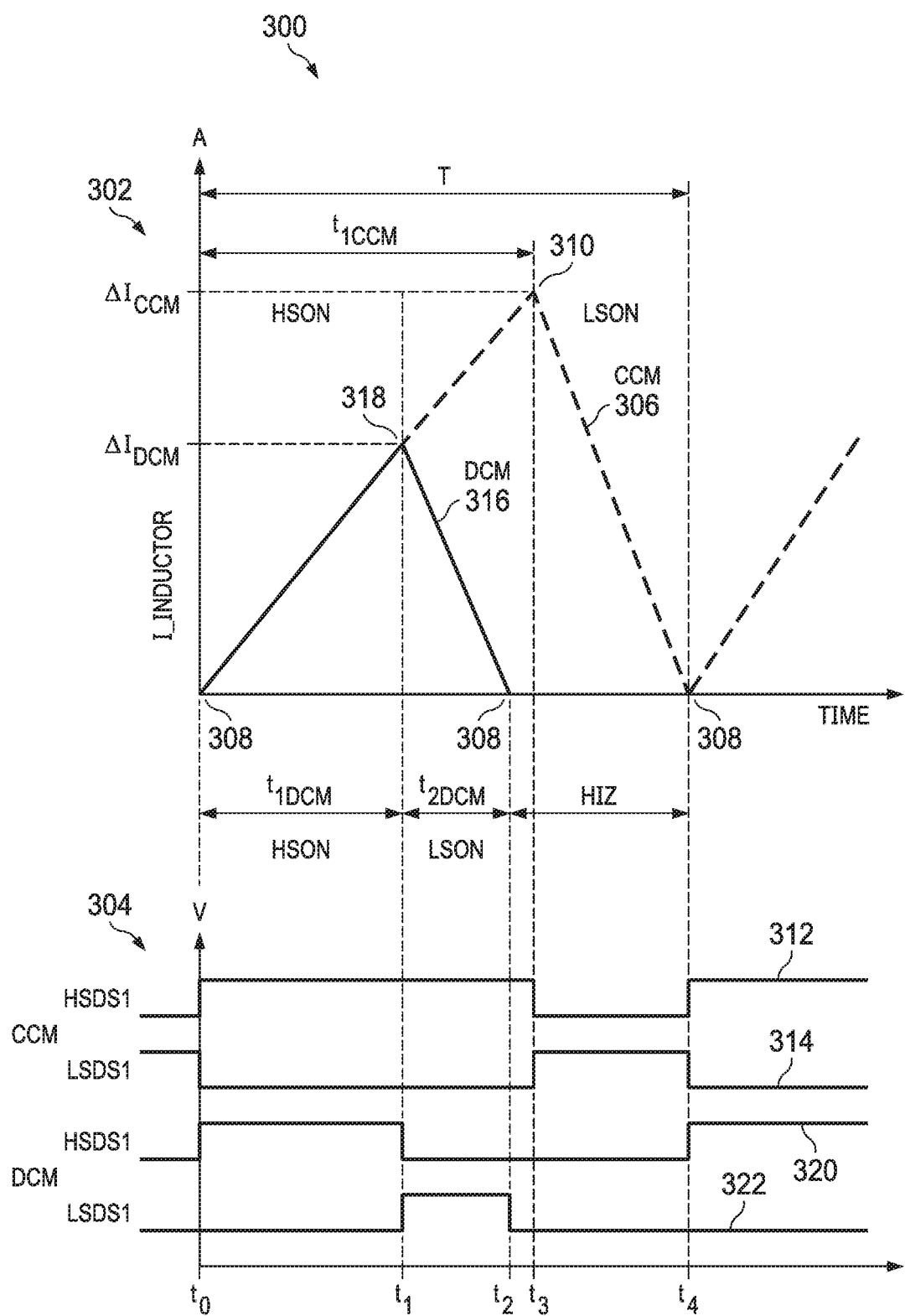
FIG. 3 illustrates waveform diagrams of inductor currents for one clock cycle of a clock signal for both a continuous condition mode (CCM) and discontinuous conduction mode (DCM) operation of a multiphase converter with respect to high-side and low-side driver signals.

The equation (4) can be applied to both CCM and dis-continuous conduction mode (DCM) of operation. For example, as shown in FIG. 3, an inductor current waveform for CCM operation is illustrated with a dashed-line and an inductor current waveform for DCM operation is illustrated with a solid-line with the corresponding HSDS1 and LSDS1 signals. The derivations for both modes of operation are described below.

In CCM operation, the multiphase converter 200 can be configured to provide an inductor current through a respective inductor of a corresponding phase (e.g., the first power stage 206), such that the inductor current does not reach a zero value during each switching cycle (e.g., clock cycle) of the high-side and low-side FETs of the respective phase. In these examples, the input current to the multiphase converter 200 can be expressed by the following equations:

$$IIN = \frac{\Delta I_{CCM} \times t_{1CCM}}{2 \times T}, \quad (5)$$

$$IOUT = \frac{\Delta I_{CCM}}{2}, \quad (6)$$

$$IIN = \frac{t_{1CCM}}{T} \times IOUT, \quad (7)$$

wherein IIN is the input current to the multiphase converter 200, IOUT is the output current being provided by the multiphase converter 200, T is a period of a corresponding clock cycle of the clock signal, $t_{1CCM}$ is the on-time of the first high-side drive signal and $\Delta I_{CCM}$ is a difference between an initial inductor current flowing through the inductor of the respective phase and a final inductor current flowing through the inductor of the phase during the on-time of the first high-side drive signal HSDS1.

Thus the output current can be determined based on the on-time of the first high-side drive signal HSDS1 over the period of the corresponding clock cycle and the input current IIN of the multiphase converter 200 during CCM operation in equation (7). As such, during CCM operation, the phase control circuit 232 can be configured to provide the phase addition and shedding thresholds ADD_TH and SHED_TH based on the duty cycle and the power efficiency of the multiphase converter 200, which are characterized by the high-side drive signal HSDS1.

In DCM operation, the multiphase converter 200 can be configured to provide the inductor current through the respective inductor of the corresponding phase (e.g., IOUT1 from the first power stage 206), such that the inductor current reaches the zero value during each switching cycle (e.g., the corresponding clock cycle) of the high-side and low-side FETs of the respective phase. In these examples, the input current to the multiphase converter 200 can be expressed by the following equations:

$$IIN = \frac{\Delta I_{DCM} \times t_{1DCM}}{2 \times T}, \quad (8)$$

$$IOUT = \frac{\Delta I_{DCM}}{2 \times T} \times (t_{1DCM} + t_{2DCM}), \quad (9)$$

$$IIN = \frac{t_{1DCM}}{(t_{1DCM} + t_{2DCM})} \times IOUT. \quad (10)$$

wherein IIN is the input voltage to the multiphase converter 200, IOUT is the output current being provided by the multiphase converter 200, T is a period of the corresponding clock cycle, $t_{1DCM}$ is the on-time of the first high-side drive signal, $t_{2DCN}$ is an on-time of the first low-side drive signal during the corresponding clock cycle, and $\Delta I_{DCM}$ is a difference between an initial inductor current flowing through the inductor of the phase and a final inductor current flowing through the inductor of the phase during the on-time of the first high-side drive signal HSDS1.

Thus, the output current IOUT can be determined based on the on-time of the first high-side drive signal HSDS1, the on-time of the first low-side drive signal LSDS1 and the input current IIN in equation (10). As such, during DCM operation, the phase control circuit 232 can be configured to generate the phase addition and shedding thresholds ADD_TH and SHED_TH accordingly.

In some examples, the multiphase converter 200 includes a cycle-by-cycle current detection circuit 260 to control phase addition (e.g., enabling of the second power stage 208). The cycle-by-cycle current detection circuit 260 includes an input coupled to the first inductor to monitor the first stage output current being provided by the high-side FET 210 of the first power stage 206. The cycle-by-cycle current detection circuit 260 during each cycle of the clock signal can be configured to compare the first stage output current being provided by the high-side FET 210 to a cycle-by-cycle current threshold. The cycle-by-cycle current detection circuit 260 can include an output coupled to provide a cycle-by-cycle current limit signal CBC_DP_HSILIM in response to determining that the first stage output current is equal to or greater than the cycle-by-cycle current threshold. The output logic 202 can include a third input coupled to receive the cycle-by-cycle current limit signal. The output logic 202 can be configured to output the second phase enable signal in response to receiving the cycle-by-cycle current limit signal to command the drive circuit 220 to enable the second power stage 208 to provide the portion of the output current.

In some examples, the multiphase converter 200 is configured to employ duty cycle information to implement phase addition. For example, the drive logic 224 may estimate a maximum duty cycle as corresponding to a duty cycle value for the first power stage 206, in which the output voltage is about equal to the input voltage. Thus, during single-phase operation, in response to the drive logic 224 determining that first power stage 206 has reached the maximum duty cycle, which is based on VOUT approximating VIN, the drive logic 224 can output a maximum duty cycle signal MAX_D to an input of the output logic 202. The maximum duty cycle signal thus may specify that the duty cycle of first power stage 206 is equal to or greater than a first phase duty cycle threshold. In other examples, a different circuit (e.g., the controller) can be used to determine the first and second phase duty cycles and provide the maximum duty cycle signal.

The output logic 202 can be configured to output the second phase enable signal in response to receiving the maximum duty cycle signal to enable the second power stage 208 to provide the second stage output current to the load 204. In some examples, the output logic 202 can be configured to output the second phase enable signal in response to determining that the maximum duty cycle signal has an amplitude that exceeds a predetermined duty cycle threshold for one or more (e.g., a predetermined number) clock cycles of the clock signal. The predetermined duty cycle threshold and the number of clock cycles of the clock signal can be user-defined. Thus, the output logic 202 can output the second phase enable signal in response to the maximum duty cycle signal having a logical high value that is greater than the predetermined duty cycle threshold for a duration that includes a number of clock cycles of the clock signal (e.g., two clock cycles).

Accordingly, the output logic 202 can implement phase addition to divide the amount of the output current being provided to the load 204 between at least two phases in response to receiving the phase addition signal PHS_ADD, the cycle-by-cycle current limit signal CBC_DP_HSILIM or the maximum duty cycle signal D_MAX. Thus, the output logic 202 can be configured to cause the multiphase converter 200 to enter multiphase operation and thus enable additional phases (e.g., the second power stage 208) to increase the amount of the output current being provided to the load 204. In examples wherein the load is the battery, the multiphase converter 200 can enter multiphase operation to implement rapid charging of the battery. Compared to that triggered by the phase addition signal generated in the phase control circuit 232, the enabling of phase addition is faster by the cycle-by-cycle current limit signal or the maximum duty cycle signal. To be able to add phases quickly can improve a load transient response of the multiphase converter 200 when loading current is increased at the output load 204.

In some examples, the multiphase converter 200 can be configured to shed the added phase to reduce the amount of the output current being provided to the load 204. For example, following rapid charging of the battery for a period of time, the multiphase converter 200 can be configured to remove (e.g., disable) the added phase (e.g., the second power stage 208) to reduce power consumption. For example, to shed the added phase, the comparator circuit 236 can be configured to output the phase shedding signal, which indicates that the output current is less than or equal to the phase shedding threshold, to command the output logic 202 to implement phase shedding. The output logic 202 can be configured to change the state of the second phase enable signal to logic low to shed (e.g., disable) the second power stage 208. In response to the second phase enable signal being driven low by the output logic 202, the AND gate 230 provides a logic low output to the second drive input of the drive circuit 220, and the drive circuit 220 disables the second power stage 208. By disabling the second power stage 208, the second power stage 208 does not provide the second phase output current to the load 204. In some examples, the output logic 202 is configured to disable the second power stage 208 in response to receiving the phase shedding signal over a set of (e.g., two or more consecutive) clock cycles of the clock signal, during which the phase addition signal and the cycle-by-cycle current limit signal are not received over the set of clock cycles of the clock signal.

In some examples, the multiphase converter 200 includes an input current sensor circuit 262 to control shedding the added phase. The input current sensor circuit 262 can include an input coupled to the input node 218 to monitor the input current being provided to the multiphase converter 200. The input current sensor circuit 262 can be configured to compare the input current to an input current threshold. The input current threshold can be user-defined or a default value. In some examples, the input current threshold has an amplitude that is in a mA range. For example, the input current sensor circuit 262 can include an output coupled to provide a low input sensed current signal IIN_LO to a fifth input of the output logic 202 in response to determining that the input current is less than or equal to the input current threshold. The output logic 202 thus can implement phase shedding based on the low input sensed current signal and cause the second power stage 208 to be disabled, as described herein.

In some examples, the multiphase converter 200 can be configured to enter a burst or a skip mode of operation, such as in response to a low amount of output current being provided to or drawn by the load (e.g., during low output current conditions, such as when the output current is less than a few mA). The drive logic 224 is configured to provide a mode enabled signal EN_SKIP to a sixth input of the output logic 202 in response to entering one of the skip mode of operation or the burst mode of operation, which can trigger shedding (e.g., disabling) the added phase and thus reduce the output current being provided to the load 204. In some examples, the output logic 202 disables the second power stage 208 in response to receiving the mode enabled signal over a first set of clock cycles of the clock signal, receiving the phase shedding signal over a second set of clock cycles of the clock signal, and not receiving the phase addition signal over the second set of clock cycles. In an example, the first set of clock cycles is four (4) clock cycles of the clock signal and the second set of clock cycles is eight (8) clock cycles of the clock signal.

Accordingly, the output logic 202 can be configured to implement phase shedding to decrease the amount of the output current being provided to the load 204. The low input current sensed signal or the mode enabled signal can be used to shed added phases in a more efficient manner (e.g., faster) compared to phase shedding that is based on the phase shedding signal as described herein, and thus save power and improve operational efficiency of the multiphase converter 100. Thus, the output logic 202 can be configured to cause the multiphase converter 200 to shed phases (e.g., the second power stage 208) as the amount of the output current for the load begins to decrease. In examples wherein the load 104 is the battery, the multiphase converter 200 can shed previously added phases as the battery is at or about a full battery charge.

Thus, by implementing the phase management technique described herein provides an efficient control scheme for phase addition and shedding over a wide range of output currents. Additionally, the multiphase converter 200 has improved load transient performance in contrasting to other multiphase converters that do not employ the output logic 202 and the phase control circuit 232, as described herein. Moreover, by implementing the phase management technique described herein in a charger system employing a multiphase converter can reduce a temperature of the charger system, thereby improving thermal performance of the charger system, which can extend the operating life of the charger system. This is because the phase management technique described herein balances an output power and power losses evenly between phases of the multiphase converter 200, which spreads heat dissipation evenly and thus reduces a temperature of system components of the charger system.

FIG. 3 illustrates waveform diagrams of inductor currents for one clock cycle of a clock signal for both CCM and DCM operation of a multiphase converter with respect to high-side and low-side driver signals. The multiphase converter can correspond to the multiphase converter 100, as illustrated in FIG. 1 or the multiphase converter 200, as illustrated in FIG. 2. Therefore, reference may be made to the example of FIGS. 1 and 2 in the following description of the example of FIG. 3. FIG. 3 includes a first plot 302 and a second plot 304. The first plot 302 has a vertical axis representing a current, which is labeled as "I_INDUCTOR" in FIG. 3, in amps (A) through an inductor of a phase (e.g., a power stage, such as the first power stage 106, as illustrated in FIG. 1), and the second plot 304 has a vertical axis representing a voltage in volts (V). Both of the first and second plots 302 and 304 include a horizontal axis representing time in a time value. The inductor current can correspond to the first stage output current, IOUT1, as illustrated in FIGS. 1 and 2. As shown in FIG. 3, inductor current through the inductor of the phase during CCM and DCM operation of the multiphase converter is plotted for one clock cycle of the clock signal. The clock signal can be provided by the clock generator 226, as illustrated in FIG. 2. The clock cycle can start at about time to and end at about time $t_4$. Thus, a time between time t0 and time t4 can be representative of a period T of the clock cycle.

As an example, at about time t0, an inductor current 306 (illustrated with a dashed line in FIG. 3) can increase from an initial inductor current amplitude 308 to a peak inductor current amplitude 310 during CCM operation of the multiphase converter. During CCM operation, the inductor current 306 can be a positive value that is greater than zero. To increase the inductor current 306 from the initial inductor current amplitude 308 to the peak inductor current amplitude 310, a drive circuit (e.g., the drive circuit 114, as illustrated in FIG. 1 or the drive circuit 220, as illustrated in FIG. 2) at about the time t0 can be configured to output a first high-side drive signal 312 having a voltage high value (e.g., greater than zero) corresponding to an on-time of the first high-side drive signal, and output a low-side drive signal 314 having a voltage low value (e.g., about zero volts). The on-time of the first high-side drive signal 312 can correspond to a duration of the clock cycle between time t0 and time t3, which is labeled as "$t_{1\,CCM}$" in FIG. 3.

As the first high-side drive signal 312 is provided to the first power stage, the inductor current 306 increases at about time t0 from the initial inductor current amplitude 308 to the peak inductor current amplitude 310 at about time t3. At about time t3, the drive circuit can be configured to output the first high-side drive signal 312 with a voltage low value and the low-side drive signal 314 with a voltage high value corresponding to an on-time of the first low-side drive signal. The on-time of the first low-side drive signal 314 can correspond to a duration of the clock cycle between time t3 and time t4, as illustrated in FIG. 3. As the first low-side drive signal 314 is provided to the inductor of the first power stage, the inductor current 306 decreases from the peak inductor current amplitude 310 at about time t3 to the initial inductor current amplitude 308 at about time t4 for a subsequent clock cycle of the clock signal.

As another example, during DCM operation of the multiphase converter, at about time t0 corresponding to the start of the clock cycle, an inductor current 316 (illustrated with a solid line in FIG. 3) through the inductor of the first power stage can increase from the initial inductor current amplitude 308 to a peak inductor current amplitude 318. To increase the inductor current 316 from the initial inductor current amplitude 308 to the peak inductor current amplitude 318 during DCM operation, the drive circuit is configured to provide a first high-side drive signal 320 having a voltage high value corresponding to an on-time of the first high-side drive signal 320, and a first low-side drive signal 322 having a voltage low value. The on-time of the first high-side drive signal 320 can correspond to a duration of the clock cycle between time $t_0$ and time $t_1$, which is labeled as "$t_{1DCM}$" in FIG. 3.

As the first high-side drive signal 320 is provided to the inductor of the first power stage during the DCM operation, the inductor current 316 increases from the initial inductor current amplitude 308 at about time t0 to the peak inductor current amplitude 318 at about time t1. At about time t1, the drive circuit is configured to output the first low-side drive signal 322 having a voltage high value corresponding to an on-time of the first low-side drive signal 322 and the first high-side drive signal 320 having a voltage low value. The on-time of the first low-side drive signal 322 can correspond to a duration of the clock cycle between time t1 and time t2, which is labeled as "$t_{2DCM}$" in FIG. 3.

As the first low-side drive signal 322 is provided to the first power stage during DCM operation, the inductor current 316 decreases from the peak inductor current amplitude 318 at about time $t_1$ to the initial inductor current amplitude 308 at about time t2. At about time t2, the drive circuit is configured to output the first low-side drive signal 322 having the voltage low value. In some examples, during DCM operation of the multiphase converter, between the time t2 and the time t4, which is labeled as "HIZ", the first power stage is off, such that the high-side and low-side FETs do not provide the first high-side and low-side drive signals 320 and 322 until the subsequent clock cycle. In some examples, the multiphase converter can be referred to as being in a high impedance (HIZ) state between the time t2 and the time t4.

Figure 4:
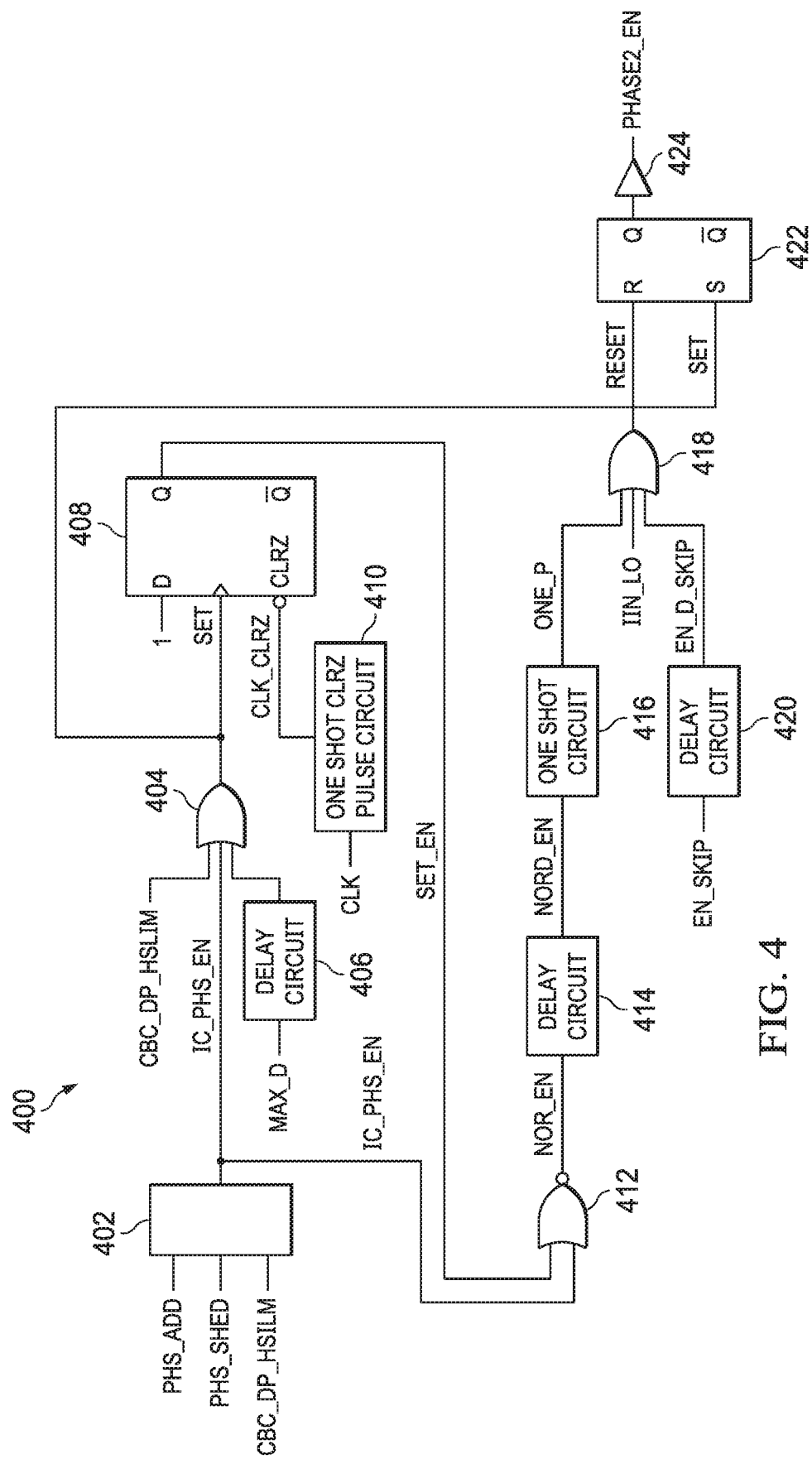
FIG. 4 illustrates an example of output logic.

FIG. 4 illustrates an example of output logic 400. The output logic 400 may be implemented as the output logic 102 of FIG. 1 or the output logic 202 of FIG. 2. Therefore, reference may be made to the examples of FIGS. 1 and 2 in the following description of the example of FIG. 4. The output logic 400 can include an input circuit 402. The input circuit 402 can be configured to receive at a first input a phase addition signal PHS_ADD and at a second input a phase shedding signal PHS_SHED. The phase addition signal PHS_ADD and the phase shedding signal PHS_SHED can be provided by a phase control circuit (e.g., the phase control circuit 116 of FIG. 1 or phase control circuit 232 of FIG. 2). As described herein, the phase addition and shedding signals PHS_ADD and PHS_SHED can be provided based on an input current (e.g., the input current IIN of FIG. 1 or 2) to a multiphase converter (e.g., the multiphase converter 100 of FIG. 1 or the multiphase converter 200 of FIG. 2) and a first set of drive signals (e.g., the first high-side and low-side drive signals HSDS1 and LSDS1 of FIG. 1 or 2). In some examples, the phase addition and shedding signals can be further provided based on a zero-crossing signal (e.g., the zero-crossing signal ZCS of FIG. 1 or 2).

The input circuit 402 can include an output coupled to provide an input current phase entry signal IC_PHS_EN to indicate whether a second power stage (e.g., the second power stage 108 of FIG. 1 or the second power stage 208 of FIG. 2) of the multiphase converter is to be enabled. The output logic 400 can include a first OR gate having a first input coupled to the output of the input circuit 402 to receive the input current phase entry signal. The first OR gate 404 can further include a second input coupled to receive a cycle-by-cycle current limit signal CBC_DP_HSILM. The cycle-by-cycle current limit signal can be provided by the cycle-by-cycle current detection circuit 260, as illustrated in FIG. 2. A third input of the first OR gate 404 can be coupled to an output of a first delay circuit 406 of the output logic 400. The first delay circuit 406 can include an input coupled to receive a maximum duty cycle signal MAX_D that provides an indication that the duty cycle of the first power stage is equal to or greater than a duty cycle phase threshold. The maximum duty cycle signal can be provided by drive logic, such as the drive logic 224 of FIG. 2. The first delay circuit 406 can be configured to delay providing the maximum duty cycle signal to the first OR gate 404 for a number of clock cycles of the clock signal, such as generated by the clock generator 226, as illustrated in FIG. 2.

In some examples, the first OR gate 404 can be configured to output a logic signal to a SET input of a first flip-flop circuit 408. The first OR gate 404 thus sets the state of the SET signal based on logically ORing the logic values of the input current phase entry signal, the cycle-by-cycle current limit signal CBC_DP_HSILM and the delayed maximum duty cycle signal MAX_D. A first input of the first flip-flop circuit 408 can be coupled to a data input. In the example of FIG. 4, the data input is coupled to receive a logical high value, which is labeled as "1" in FIG. 4. The first flip-flop circuit 408 includes a Q output coupled to provide a set enabled signal SET_EN. In some examples, a third input of the first flip-flop circuit 408 can be coupled to an output of a clock clear circuit 410. An input of the clock clear circuit 410 can be coupled to receive a clock signal CLK, such as from the clock generator 226 of FIG. 2. The clock clear circuit 410 can be coupled to provide at the output a clock clear signal CLK_CLRZ. In some examples, the clock clear signal can be provided to the first flip-flop circuit 408 to clear the first flip-flop circuit 408, such that the set enabled signal SET_EN at the Q output is cleared.

The output logic 400 can include a NOR gate 412. A first input of the NOR gate 412 is coupled to the Q output of the first flip-flop circuit 408 to receive the set enabled signal. A second input of the NOR gate 412 can be coupled to the output of the input circuit 402 to receive the input current phase entry signal from input circuit 402. The NOR gate 412 can include an output coupled to provide a NOR gate signal NOR_EN based on logically NORing the input current phase entry signal and the set enabled signal. The output logic 400 can further include a second delay circuit 414. The second delay circuit 414 can include an input coupled to the output of the NOR gate 412. An output of the second delay circuit 414 can be coupled to provide a delayed NOR gate signal NORD_EN to an input of a one shot circuit 416 of the output logic 400. The one shot circuit 416 can be configured to provide a one-shot pulse signal ONE_P in FIG. 4 based on the delayed NOR gate signal.

The output logic 400 can further include a second OR gate 418. A first input of the second OR gate 418 is coupled to the output of the one shot circuit 416 to receive the one-shot pulse signal. A second input of the second OR gate 418 is coupled to receive a low input sensed current signal IIN_LO. For example, the low input sensed current signal can be provided by the input current sensor circuit 262 of FIG. 2 in response to determining that the input current is less than or equal to the input current threshold. A third input of the second OR gate 418 can be coupled to an output of a third delay circuit 420. The third delay circuit 420 can include an input coupled to receive a mode enabled signal EN_SKIP. For example, the mode enabled signal EN_SKIP is provided by drive logic (e.g., the drive logic 224 of FIG. 2) in response to the multiphase converter entering a power saving mode, which may include a skip mode of operation or a burst mode of operation. A third delay circuit 420 can be configured to delay the mode enabled signal EN_SKIP for a number of clock cycles to provide a delayed mode enabled signal EN_D_SKIP. The second OR gate 418 can be configured to output a logical phase output signal RESET based on logically ORing the one-shot pulse signal ONE_P, the low input sensed current signal and the delayed mode enabled signal EN_D_SKIP.

The output logic 400 can further include a second flip-flop circuit 422, which is demonstrated as an SR flip-flop. A first input of the second flip-flop circuit 422 can be coupled to the output of the second OR gate 418 to receive the logical phase output signal. A second input of the second flip-flop circuit 422 can be coupled to receive the set output of the first OR gate 404. The second flip-flop circuit 422 can be coupled to output a second stage enable signal PHASE2_EN. The second stage enable signal can be employed to enable and disable the second power stage 108 of FIG. 1 or the second power stage 208 of FIG. 2, as described herein.

In some examples, the output logic 400 includes a buffer gate 424 that includes an input and an output. The input of the buffer gate 424 can be coupled to an output of the second flip-flop circuit 422 to receive the second stage enable signal. The output of the buffer gate 424 can be configured to provide the second stage enable signal. The output logic 400 can provide the second stage enable signal in one of a first state and a second state. For example, the first state of the second stage enable signal can be indicative of enabling the second power stage and the second state of the second stage enable signal can be indicative of disabling the second power stage. Accordingly, the output logic 400 can provide the second stage enable signal to control the addition and shedding of phases as the output current changes during operation of the multiphase converter.

Figure 5:
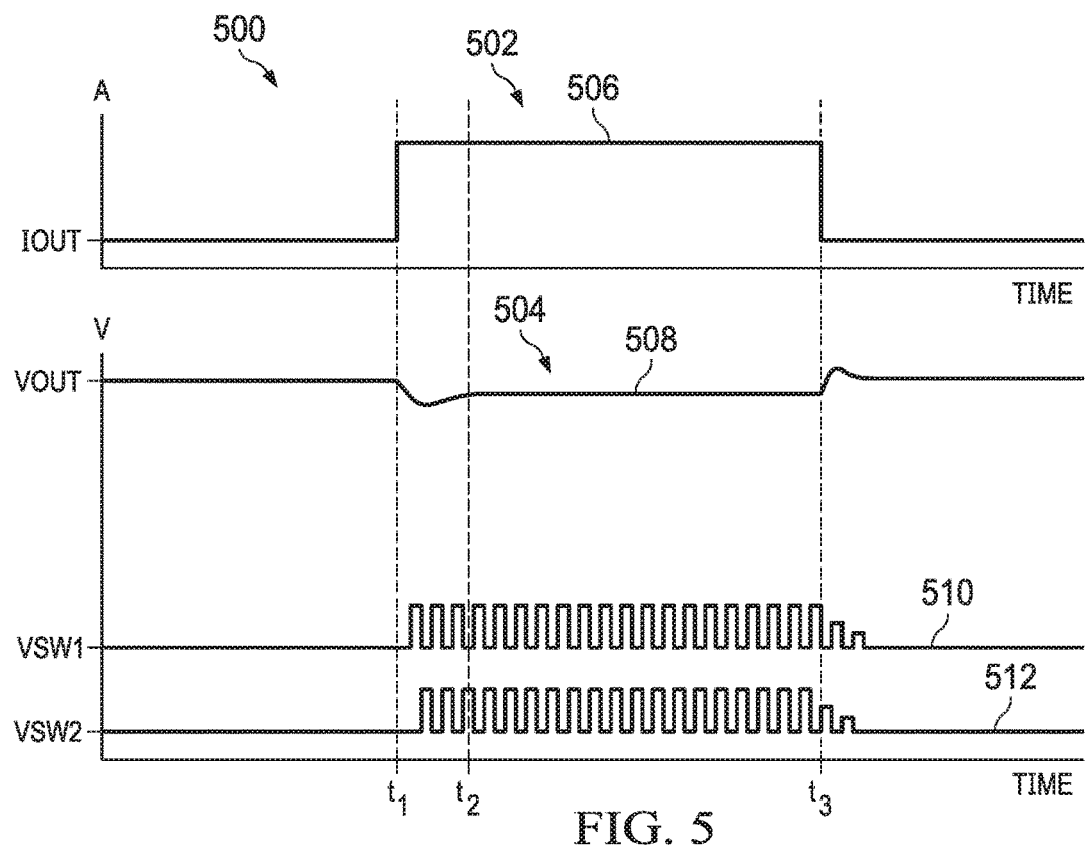
FIG. 5 is a waveform diagram illustrating an example of load transient performance of a multiphase converter employing a cycle-by-cycle current detection circuit for phase addition.

FIG. 5 is a waveform diagram 500 illustrating an example of load transient performance of a multiphase converter employing a cycle-by-cycle current detection circuit for phase addition. In some examples, the waveform diagram 500 can be associated with an operation of the multiphase converter 100, as illustrated in FIG. 1 or the multiphase converter 200, as illustrated in FIG. 2. Thus, the cycle-by-cycle current detection circuit can correspond to the cycle-by-cycle current detection circuit 260, as illustrated in FIG. 2. As such, reference may be made to the examples of FIGS. 1 and 2 in the following description of the example of FIG. 5. The waveform diagram 500 includes a first plot 502 and a second plot 504. The first plot 502 has a vertical axis representing a current in amps (A) and the second plot 504 has a vertical axis representing a voltage in volts (V). Both of the first and second plots 502 and 504 include a horizontal axis representing time in a time value.

The first plot 502 includes an output current 506 that has been plotted over time. The output current can correspond to the output current IOUT, as described with respect to FIG. 1 and FIG. 2. In some examples, the loading current demand is increased at a load (e.g., the load 104 of FIG. 1 or the load 204 of FIG. 2). The output current 506 can be provided based on a first stage output current and a second stage output current. The first stage output current can be provided by a first power stage of the multiphase converter, such as the first power stage 106 of FIG. 1 or the second power stage 206 of FIG. 2 and the second stage output current can be provided by a second power stage of the multiphase converter, such as the second power stage 108 of FIG. 1 or the second power stage 208 of FIG. 2. The second plot 504 includes an output voltage VOUT 508, a first switch node voltage VSW1 510 and a second switch node voltage VSW2 512. The output voltage can correspond to the output voltage VOUT, as described with respect to FIG. 1 and FIG. 2. The output voltage 508 can be provided to a load (e.g., the load 104 of FIG. 1). The switch node voltages 510 and 512 can correspond to voltages of the first and second power stages at corresponding switch nodes SW1 and SW2, as illustrated in FIG. 2.

During single-phase operation of the multiphase converter, the first power stage is configured to provide the first stage output current as the output current 506 to the load. During a light load condition, the single-phase is under power saving mode (e.g. skip mode or burst mode of operation). At about time t1, a load transient condition can occur, such that there is a rapid rise in the output current 506 for the load. The multiphase converter can exit single-phase power saving mode and enter PWM mode of operation, such that respective switches of the first power stage switch to provide the switch node voltage 510. The load transient condition can cause the output voltage 508 to drop (e.g., dip) for a period of time after time t1. By way of further example, the first output voltage can be 4.3V and the second output voltage can be about 4.1V.

To provide additional output current and thus reduce an amount of voltage drop in the output voltage 508, the cycle-by-cycle current detection circuit can monitor the first stage output current being provided by the first power stage and output the cycle-by-cycle current limit signal to provide an indication that the first stage output current is equal to or greater than the current limit threshold. An output logic (e.g., the output logic 102 of FIG. 1 or the output logic 202 of FIG. 2) of the multiphase converter can enable the second power stage to provide a portion of the output current 506 to the load in response to receiving the cycle-by-cycle current limit signal. In response to enabling the second power stage respective switches of the second power stage switch to provide the switch node voltage 512. By enabling the second power stage to provide the second stage output current as part of the output current 506 to the load reduces an amount of output voltage drop and enables the output voltage 508 to recover back to a greater voltage at time t2. At time t3, the load demand is decreased to the light load condition, and the second phase is shed and the first power stage can return to power saving mode of operation.

Figure 6:
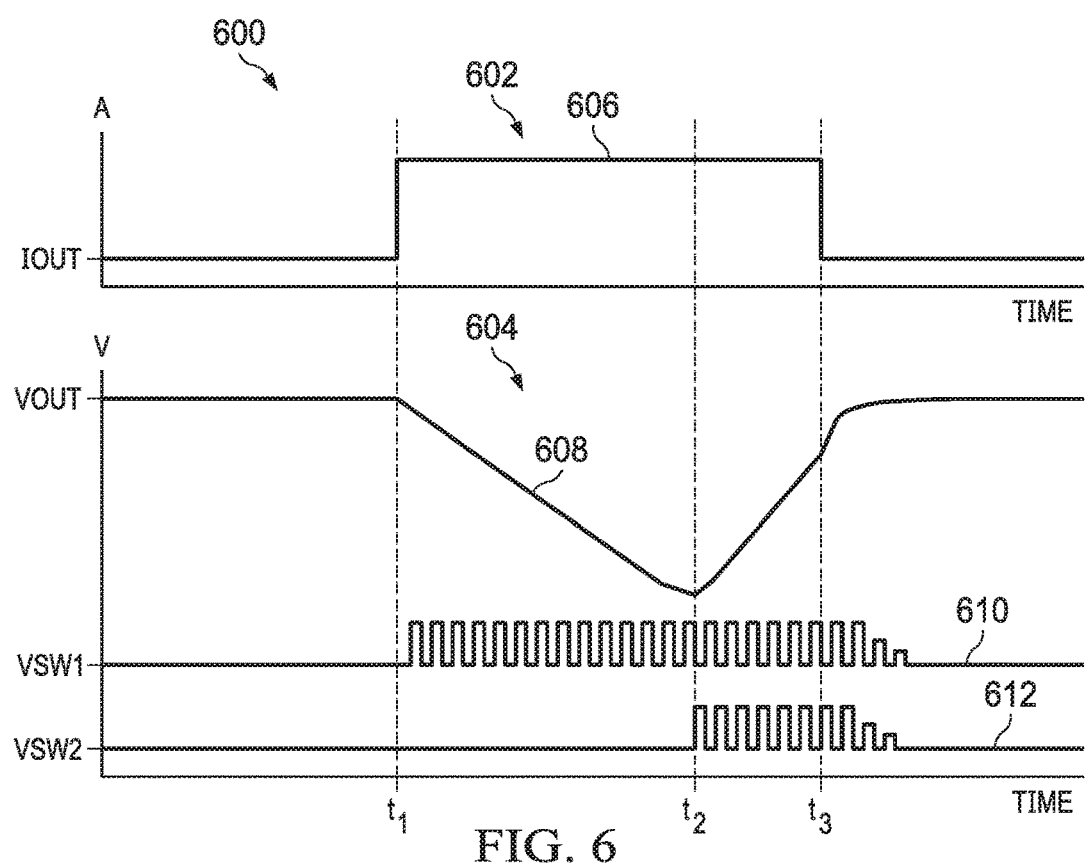
FIG. 6 is a waveform diagram illustrating another example of load transient performance of a multiphase converter without a cycle-by-cycle current detection circuit for phase addition.

FIG. 6 is a waveform diagram 600 illustrating another example of load transient performance of a multiphase converter without a cycle-by-cycle current detection circuit for phase addition. In these examples, the multiphase converter is not configured with the cycle-by-cycle current detection circuit 260, as illustrated in FIG. 2, and can be referred to an existing multiphase converter. As such, the multiphase converter can be implemented without the phase control management scheme as described herein. The waveform diagram 600 includes a first plot 602 and a second plot 604. The first plot 602 has a vertical axis representing a current in amps (A) and the second plot 604 has a vertical axis representing a voltage in volts (V). Both of the first and second plots 602 and 604 include a horizontal axis representing time in a time value.

The first plot 602 includes an output current 606 that has been plotted over time, which can be provided by the existing multiphase converter. For some examples, the loading current demand is increased at a load (e.g., the load 104 of FIG. 1 or the load 204 of FIG. 2). The output current 606 can be provided based on a first stage output current and a second stage output current. The first stage output current can be provided by a first power stage and the second stage output current can be provided by a second power stage of the existing multiphase converter. The second plot 604 includes an output voltage 608 that can be provided by the existing multiphase converter to the load, a first switch node voltage 610 and a second switch node voltage 612. The switch node voltages 610 and 612 can correspond to voltages of the first and second power stages at corresponding switch nodes of the existing multiphase converter.

As a further example, during operation of the existing multiphase converter, such as single-phase operation during a light load condition in a power saving mode, the first power stage is configured to provide the first stage output current as the output current 606 to the load. At about time t1, a load transient condition can occur, such that there is a rapid rise in the output current 606 is provided to the load. The existing multiphase converter can exit power saving mode and enter a PWM mode of operation, such that switches of the first power stage switch to provide the switch node voltage 610. The load transient condition can cause the output voltage 608 to drop (e.g., dip) from a first voltage to a second voltage, which exceeds a current capability of single-phase operation for a period of time after time t1. The output voltage 608 can continue to decrease from about time t1 to about a time t2 at which the output voltage is less than the first output voltage. To provide additional output current, the existing multiphase converter is configured to enable the second power stage. Because the existing multiphase converter does not employ cycle-by-cycle current limit detection, the existing multiphase converter is configured to enable the second power stage slowly at about time t2 and thus provide the second stage output current as part of the output current 606. In response to enabling the second power stage respective switches of the second power stage switch to provide the switch node voltage 612 to increase the output voltage from the first voltage to the second voltage.

At about time t3, the output voltage 608 can be equal to about the first output voltage before the output loading current is decreased. Because the existing multiphase converter does not employ the phase management scheme described herein, a greater amount of time is needed to increase the output voltage 608. Accordingly, the multiphase converter 100 of FIG. 1 or the multiphase converter 200 of FIG. 2 implemented with the phase management scheme, as described herein, can respond to load transients faster, such that the output voltage can be quickly recovered in contrast to existing multiphase converters without the phase management scheme, such as employing the cycle-by-cycle current detection circuit.

Figure 7:
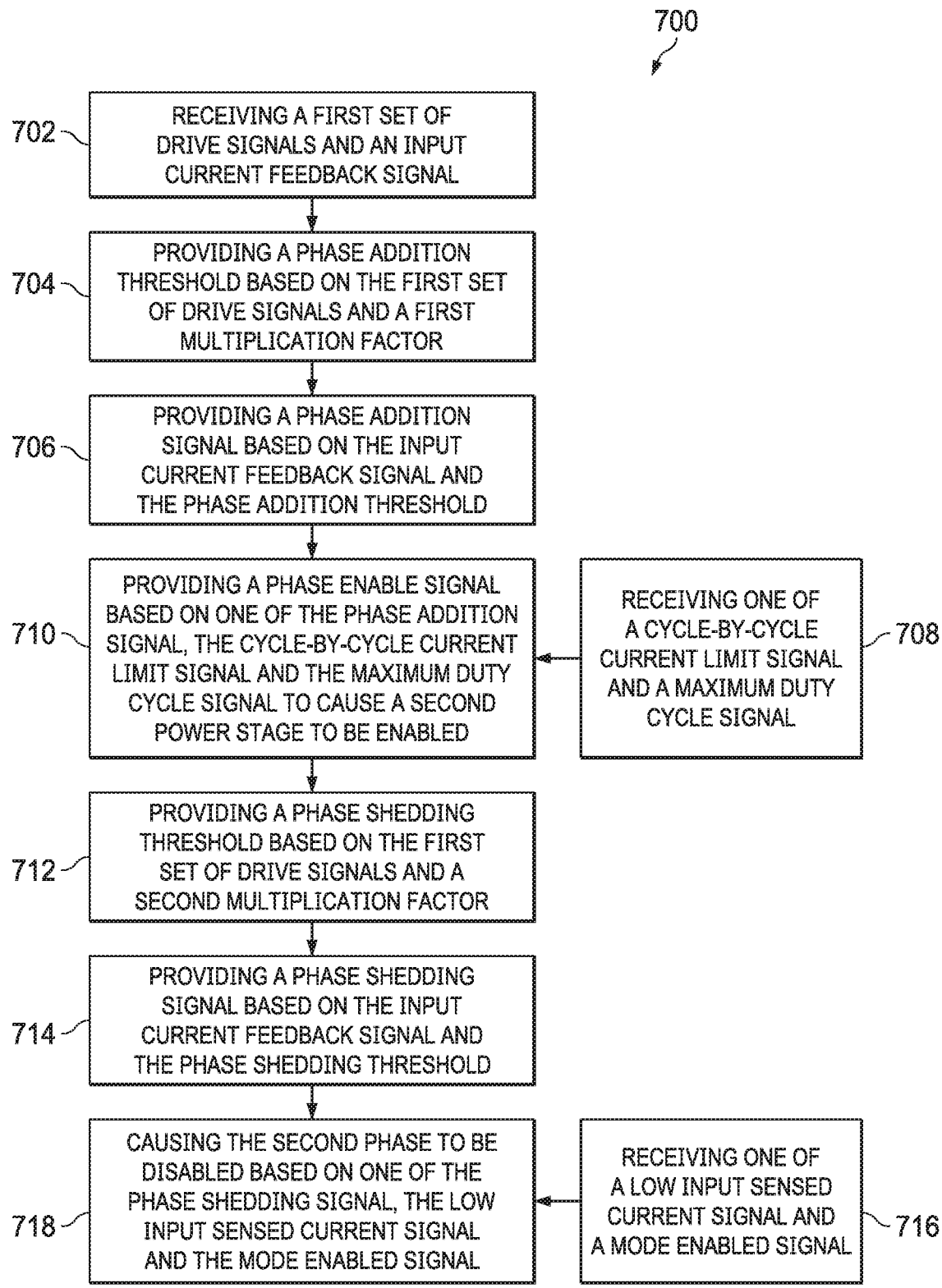
FIG. 7 is a flow diagram illustrating an example of a method for multi-path phase management of a multiphase converter.

In view of the foregoing structural and functional features described above, example methods will be better appreciated with reference to FIG. 7. While, for purposes of simplicity of explanation, the example method of FIG. 7 is shown and described as executing serially, it is to be understood and appreciated that the example method is not limited by the illustrated order, as some actions could in other examples occur in different orders, multiple times and/or concurrently from that shown and described herein.

FIG. 7 is a flow diagram illustrating an example of a method 700 for multi-path phase management of a multiphase converter. The multiphase converter may be implemented by the multiphase converter 100, as illustrated in FIG. 1 or the multiphase converter 200, as illustrated in FIG. 2. Therefore, reference may be made to the examples of FIGS. 1 and 2 in the following description of the example of FIG. 7. In some examples, the method 700 can begin at 702, by receiving a first set of drive signals and an input current feedback signal indicative of an input current being provided to the multiphase converter 100. The first set of drive signals can be provided to a first power stage (e.g., the first power stage 106 of FIG. 1 or the first power stage 206 of FIG. 2) of the multiphase converter to provide a first stage output current (e.g., the first stage output current IOUT1 of FIG. 1 or FIG. 2) to an output node (e.g., the output node 110 of FIG. 1) of the multiphase converter. The input current feedback signal can be provided by an input current feedback circuit (e.g., the input current feedback circuit 118, as illustrated in FIG. 1).

At 704, the method 700 provides a phase addition threshold (e.g., the phase addition threshold ADD_TH of FIG. 1 or FIG. 2) based on the first set of drive signals and a first multiplication factor. In some examples, the phase addition threshold is further provided based on a zero-crossing signal, such as from a zero-crossing detection circuit (e.g., the zero-crossing detection circuit 244, as illustrated in FIG. 2). At 706, the method 700 provides a phase addition signal (e.g., the PHS_ADD of FIG. 1 or FIG. 2) in response to the input current feedback signal being greater than or equal to the phase addition threshold. In some examples, at 708, the method 700 receives one of a cycle-by-cycle current limit signal and a maximum duty cycle signal. The cycle-by-cycle current limit signal can be provided by a cycle-by-cycle current detection circuit (e.g., the cycle-by-cycle current detection circuit 260 of FIG. 2) in response to determining that the first stage output current is equal to or greater than a cycle-by-cycle current threshold. The maximum duty cycle signal can be provided by drive logic (e.g., the drive logic 224 of FIG. 2) in response to determining that a duty cycle of the first power stage is equal to or greater than a duty cycle phase threshold. By implementing the method at 708 one or more phases can be added more efficiently (e.g., faster) and thus improve a load transient response of the multiphase converter, as described herein.

At 710, the method 700 provides a phase enable signal based on one of the phase addition signal, the cycle-by-cycle current limit signal and the maximum duty cycle signal to cause a second power stage (e.g., the second power stage 108 of FIG. 1 or the second power stage 208 of FIG. 2) to be enabled, such that the second power stage provides a second stage output current (e.g., the second stage output current IOUT2 of FIG. 1 and FIG. 2). The first and second stage output currents can be provided to the load 104 as the output current.

In some examples, at 712, the method 700 provides a phase shedding threshold (e.g., the phase shedding threshold SHED_TH of FIG. 1 or FIG. 2) based on the first set of drive signals and a second multiplication factor. In some examples, the phase shedding threshold is further provided based on a zero-crossing signal, such as from the zero-crossing detection circuit 244, as illustrated in FIG. 2. At 714, the method 700 provides a phase shedding signal (e.g., the phase shedding signal PHS_SHED of FIG. 1 or FIG. 2) in response to the input current feedback signal being less than or equal to the phase shedding threshold. In some examples, at 716, the method 700 receives one of a low input sensed current signal and a mode enabled signal EN_SKIP. An input current sensor circuit (e.g., the input current sensor circuit 262 of FIG. 2) can be configured to output the low input sensed current signal in response to determining that the input current is less than or equal to an input current threshold. Drive logic (e.g., the drive logic 224 of FIG. 2) can be configured to output the mode enabled signal EN_SKIP, such as in response to causing the multiphase converter entering a skip or burst mode of operation. By implementing the method at 716 one or more previously added phases can be shed more efficiently (e.g., faster) and thus improve an operational efficiency of the multiphase converter and save power, as described herein.

At 718, the method 700 can cause the second power stage to be disabled based on one of the phase shedding signal, the low input sensed current signal and the skip enabled signal, such that the second power stage does not provide the second stage output current, and thus does not provide a portion of the output current to the load.

In this description and the claims, the term "based on" means based at least in part on.

Modifications are possible in the described embodiments, and other embodiments are possible, within the scope of the claims.

What is claimed is:

1. A system comprising:
   a phase control circuit having a current feedback input, drive control inputs and a phase control output, the current feedback input adapted to be coupled to a current input of a multiphase converter, the multiphase converter having first and second power stages, the first power stage having first drive inputs, the second power stage having second drive inputs, and the drive control inputs adapted to be coupled to the first drive inputs, in which the phase control output is responsive to the current feedback input and the drive control inputs; and
   output logic having a logic input and a logic output, the logic input coupled to the phase control output, and the logic output adapted to be coupled through a drive circuit to the second drive inputs, in which the logic output is configured to control a state of the second drive inputs responsive to the logic input.

2. The system of claim 1, further comprising the second power stage of the multiphase converter, the output logic is configured to enable and disable the second power stage of the multiphase converter responsive to the logic input.

3. The system of claim 1, wherein the phase control circuit comprises:
   a reference generator circuit having a voltage reference input, a phase addition reference output and a phase subtraction reference output, the voltage reference input adapted to be coupled to a reference voltage circuit, the phase addition reference output and the phase subtraction reference output being responsive to the first drive inputs and the voltage reference input; and
   a comparator circuit having a comparator phase addition input, a comparator phase subtraction input, and the phase control output, the phase control output having a comparator phase addition output and a comparator phase subtraction output, the comparator phase addition input coupled to the phase addition reference output and the comparator phase subtraction input coupled to the phase subtraction reference output, the comparator phase addition output being responsive to the current feedback input and the comparator phase addition input, and the comparator phase subtraction output being responsive to the current feedback input and the comparator phase subtraction input.

4. The system of claim 3, wherein reference generator includes a first drive signal input and a second drive signal input, the first drive signal input adapted to be coupled to one of the first drive inputs of the first power stage and the second drive signal input adapted to be coupled to a remaining input of the first drive inputs of the first power stage.

5. The system of claim 3, wherein the reference generator circuit includes a zero-cross input, the zero-crossing input adapted to be coupled to a zero-crossing detection circuit, the phase addition reference output and the phase subtraction output being further responsive to the zero-crossing input.

6. The system of claim 5, wherein:
   the comparator circuit includes a first comparator circuit and a second comparator circuit,
   the first comparator circuit having the comparator phase addition input, the comparator phase addition output and a first comparator feedback input, the first comparator feedback input adapted to be coupled to the current input of the multiphase converter in which the comparator phase addition output is responsive to the first comparator feedback input and the comparator phase addition input; and
   the second comparator circuit having the comparator phase subtraction input, the comparator phase subtraction output and a second comparator feedback input, the second comparator feedback input adapted to be coupled to the current input of the multiphase converter in which the comparator phase subtraction output is responsive to the second comparator feedback input and the comparator phase subtraction input.

7. The system of claim 6, wherein the logic input includes a phase add logic input and a phase shed logic input, the phase add logic input coupled to the comparator phase addition output and the phase shed logic input coupled to the comparator phase subtraction output, the logic output is configured to control the state of the second drive inputs responsive to one of the phase add logic input and the phase shed logic input.

8. The system of claim 7, wherein the output logic is configured to provide at the logic output an output control signal having a first state to enable the second power stage of the multiphase converter responsive to the phase add logic input.

9. The system of claim 8, wherein the output logic is configured to provide at the logic output the output control signal having a second state to disable the second power stage of the multiphase converter responsive to the phase shed logic input.

10. The system of claim 6, wherein the reference generator circuit includes:
- a first field-effect transistor (FET) having a gate, a drain and a source, the gate of the first FET adapted to be coupled to one of the first drive inputs of the first power stage and the drain adapted to be coupled to the reference voltage circuit;
- a second FET having a gate, a drain and a source, the source of the first FET being coupled to the drain of the second FET;
- a first logic gate having a first logic gate input adapted to be coupled to a remaining input of the first drive inputs of the first power stage, a second logic gate input coupled to a second logic gate output of a second logic gate, and a logic gate output coupled to the gate of the second FET to drive the second FET responsive to the first and second logic gate inputs;
- the second logic gate having a zero-crossing logic gate input adapted to be coupled to a zero-crossing detection circuit and the second logic gate output coupled to the second logic gate input of the first logic gate and being responsive to the zero-crossing logic gate input, the first and second FETs being configured to modulate a reference voltage provided by the reference voltage circuit to provide a modulated reference voltage responsive to the gate of the first FET and the gate of the second FET; and
- a multiplier circuit including a multiplier input and a first multiplier output and a second multiplier output, the multiplier input coupled to the source of the first FET and the drain of the second FET to receive the modulated reference voltage and multiply the modulated reference by a respective multiplication factor to provide a phase addition threshold at the first multiplier output and a phase shedding threshold at a second multiplier output, the first multiplier output coupled to the comparator phase addition input and the second multiplier output coupled to the comparator phase subtraction input.

11. The system of claim 10, wherein the output logic includes an input current sensed input adapted to be coupled to an input current sensor circuit, the output logic is configured to control the state of the second drive inputs further responsive to the input current sensed input.

12. The system of claim 11, wherein the output logic includes a drive logic input adapted to be coupled to drive logic, the output logic is configured to control the state of the second drive inputs further responsive to the input drive logic input.

13. The system of claim 12, wherein the output logic includes a cycle-by-cycle current input adapted to be coupled to a cycle-by-cycle current detection circuit, the output logic is configured to control the state of the second drive inputs further responsive to the cycle-by-cycle current input.

14. The system of claim 13, wherein the output logic includes a duty cycle input adapted to be coupled to the drive logic, the output logic is configured to control the state of the second drive inputs further responsive to the duty cycle input.

15. A multiphase converter comprising:
- a drive circuit adapted to be coupled to a first power stage and to provide a set of drive signals to drive the first power stage to provide a first stage output current to an output terminal of the multiphase converter;
- an input terminal being coupled to receive an input current;
- a phase control circuit having a current feedback input coupled to receive an input current feedback signal indicative of the input current at the input terminal and drive control inputs coupled to receive a respective drive signal of the set of drive signals, the phase control circuit including a phase control output coupled to provide a phase control signal based on the input current feedback signal and the set of drive signals, the phase control signal including a state that indicates enabling a second power stage of the multiphase converter, which provides an output current that is based on a current from the first and second power stages; and
- output logic having a logic output adapted to be coupled to the drive circuit and provide an output control signal including a state, which is based on the phase control signal, to enable the second power stage.

16. The multiphase converter of claim 15, wherein the phase control circuit comprises:
- a reference generator circuit including a voltage reference input coupled to receive a reference voltage, a first drive signal input coupled to receive a first drive signal of the first set of drive signals and a second drive signal input coupled to receive a second drive signal of the first set of drive signals, the reference generator circuit including a phase addition reference output to provide a phase addition threshold based on the first drive signal, the second drive signal, and the reference voltage; and
- a comparator circuit including a comparator phase addition input coupled to receive the phase addition threshold and the current feedback input coupled to receive the input current feedback signal, the comparator circuit being configured to provide a phase addition signal based on the input current feedback signal and the phase addition threshold, the phase addition signal corresponding to the phase control signal.

17. The multiphase converter of claim 16, wherein the reference generator circuit includes:
- a first field-effect transistor (FET) having a gate, a drain and a source, the gate of the first FET adapted to be coupled to a first drive input of the first power stage to receive the first drive signal and the drain being coupled to receive the reference voltage;
- a second FET having a gate, a drain and a source, the source of the first FET being coupled to the drain of the second FET;
- a first logic gate having a first logic gate input adapted to be coupled to a second drive input of the second power stage to receive the second drive signal, a second logic gate input coupled to a second logic gate output of a second logic gate, and a logic gate output coupled to the gate of the second FET to drive the second FET based on the second drive signal and an inverted zero-crossing signal; and
- the second logic gate having a zero-crossing logic gate input adapted to be coupled to a zero-crossing detection circuit to receive the zero-crossing signal and the second logic gate output to provide the inverted zero-crossing signal, the second logic gate being configured to invert the zero-crossing signal to provide the inverted zero-crossing signal, the first and second FETs being configured to modulate the reference voltage to provide the modulated reference voltage based on the first drive signal, the second drive signal and the zero-crossing signal.

18. The multiphase converter of claim 17, wherein the reference generator circuit includes a multiplier circuit including a multiplier input to receive the modulated reference voltage and multiply the modulated reference by a multiplication factor to provide the phase addition threshold.

19. The multiphase converter of claim 18, wherein:
the state of the output control signal is a first state;
the multiplication factor is a first multiplication factor, the multiplier circuit being further configured to multiply the modulated reference by a second multiplication factor to provide a phase shedding threshold; and
the comparator circuit includes a comparator phase subtraction input coupled to receive the phase shedding threshold, the comparator circuit being configured to provide a phase shedding signal based on the input current feedback signal and the phase shedding threshold, the output logic being configured provide the output control signal including a second state to disable the second power stage.

20. The multiphase converter of claim 19, wherein:
the comparator circuit includes a first comparator circuit and a second comparator circuit;
the first comparator circuit includes a comparator phase addition input coupled to receive the phase addition threshold and a first comparator feedback input coupled to receive the input current feedback signal, the first comparator circuit being configured to provide the phase addition signal based on the input current feedback signal and the phase addition threshold; and
the second comparator circuit includes the comparator phase subtraction input coupled to receive the phase shedding threshold and a second comparator feedback input coupled to receive the input current feedback signal, the second comparator circuit being configured to provide the phase shedding signal based on the input current feedback signal and the phase shedding threshold.

21. The multiphase converter of claim 20, wherein the output logic includes a logic input adapted to be coupled to an input current sensor circuit to receive an input current sensed signal indicating that the input current is less than or equal to an input current threshold, the output logic being configured to provide the output control signal having the second state in response to receiving the input current sensed signal, such that the second phase is disabled.

22. The multiphase converter of claim 21, wherein the output logic includes a phase enabling input adapted to be coupled to one of:
a cycle-by-cycle current detection circuit and to receive a cycle-by-cycle current limit signal indicating that the current being provided by the first power stage is equal to or greater than a current limit threshold; and
drive logic and to receive a duty cycle signal indicating that the duty cycle of the first phase is equal to or greater than a duty cycle phase threshold, the output logic being configured to provide the output control signal having the first state based on one of the cycle-by-cycle current limit signal and the duty cycle signal, such that the second power stage is enabled.

23. The multiphase converter of claim 21, wherein the output logic includes a phase disabling input adapted to be coupled to one of:
a cycle-by-cycle current detection circuit and to receive a cycle-by-cycle current limit signal indicating that the current being provided by the first power stage is equal to or greater than a current limit threshold; and
drive logic and to receive a duty cycle signal indicating that the duty cycle of the first phase is equal to or greater than a duty cycle phase threshold, the output logic being configured to provide the output control signal having the second state based on one of the cycle-by-cycle current limit signal and the duty cycle signal, such that the second power stage is enabled.

24. The multiphase converter of claim 20, wherein the output logic includes a drive logic input adapted to be coupled to the drive logic and to receive a mode enabled signal indicating that the multiphase converter is to enter one of a skip mode of operation or a burst mode of operation for power saving, the output logic being configured to provide the output control signal having the second state in response receiving the mode enabled signal, such that the second power stage is disabled.

25. A circuit comprising:
a reference generator circuit includes a first input adapted to be coupled to a first output of a drive circuit, a second input adapted to be coupled to a second output of the drive circuit and a third input adapted to be coupled to a voltage reference circuit;
a comparator circuit includes a first input coupled to a first output of the reference generator circuit, a second input coupled to a second output of the reference generator circuit and a third input adapted to be coupled to an output of an input current feedback circuit; and
output logic includes a first input coupled to a first output of the comparator circuit, a second input coupled to a second output of the comparator circuit, and an output adapted to be coupled to an input of the drive circuit.

26. The circuit of claim 25, wherein the reference generator circuit includes:
a first field-effect transistor (FET) comprising a gate, a drain and a source, the gate of the first FET being adapted to be coupled to the first output of the drive circuit and the drain being adapted to be coupled to the voltage reference circuit;
a second FET comprising a gate, a drain and a source, the source of the first FET being coupled to the drain of the second FET;
a first logic gate comprising a first input being adapted to be coupled to the second output of the drive circuit, a second input, and an output coupled to the gate of the second FET; and
a second logic gate comprising an input adapted to be coupled to a zero-crossing detection circuit and an output coupled to the second input of the first logic gate.

27. The circuit of claim 26, wherein the reference generator circuit further includes a multiplier circuit including an input coupled to the source of the first FET and the drain of the second FET, a first output coupled to the first input of the comparator circuit and a second output coupled to the second input of the comparator.

28. The circuit of claim 27, wherein:
the comparator circuit includes a first comparator circuit and a second comparator circuit;
the first comparator comprises a first input coupled to the first output of the multiplier circuit, a second input coupled to the output of the input current feedback circuit, and an output coupled to the first input of the output logic; and
the second comparator comprises a first input coupled to the second output of the multiplier circuit, a second input coupled to the output of the input current feedback circuit, and an output coupled to the second input of the output logic.

\* \* \* \* \*